United States Patent
Havens

(10) Patent No.: US 8,027,095 B2
(45) Date of Patent: Sep. 27, 2011

(54) CONTROL SYSTEMS FOR ADAPTIVE LENS

(75) Inventor: William H. Havens, Syracuse, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 625 days.

(21) Appl. No.: 11/546,531

(22) Filed: Oct. 11, 2006

(65) Prior Publication Data

US 2007/0080280 A1    Apr. 12, 2007

Related U.S. Application Data

(60) Provisional application No. 60/725,531, filed on Oct. 11, 2005, provisional application No. 60/778,569, filed on Mar. 2, 2006.

(51) Int. Cl.
*G02B 1/06* (2006.01)
*G02B 3/12* (2006.01)

(52) U.S. Cl. .................................... 359/666; 359/665

(58) Field of Classification Search ................. 359/665, 359/666
See application file for complete search history.

(56) References Cited

U.S. PATENT DOCUMENTS

| | | |
|---|---|---|
| 1,269,422 A | 6/1918 | Gordon |
| 2,062,468 A | 12/1936 | Matz |
| 2,300,251 A | 10/1942 | Flint |
| 3,161,718 A | 12/1964 | DeLuca |
| 3,305,294 A | 2/1967 | Alvarez |
| 3,583,790 A | 6/1971 | Baker |
| 3,761,157 A | 9/1973 | Humphrey |
| 3,778,170 A | 12/1973 | Howell et al. |
| 4,134,393 A | 1/1979 | Stark et al. |
| 4,191,594 A | 3/1980 | Stark et al. |
| 4,210,121 A | 7/1980 | Stark |
| 4,249,516 A | 2/1981 | Stark |
| 4,261,655 A | 4/1981 | Honigsbaum |
| 4,286,839 A | 9/1981 | Ilzig et al. |
| 4,289,379 A | 9/1981 | Michelet et al. |
| 4,312,709 A | 1/1982 | Stark et al. |
| 4,407,567 A | 10/1983 | Michelet et al. |
| 4,487,659 A | 12/1984 | Stark |
| 4,514,048 A | 4/1985 | Rogers |
| 4,783,153 A | 11/1988 | Kushibiki et al. |
| 4,783,155 A | 11/1988 | Imataki et al. |
| 4,784,479 A | 11/1988 | Ikemori et al. |
| 4,802,746 A | 2/1989 | Baba et al. |

(Continued)

FOREIGN PATENT DOCUMENTS

CN    1677152 A    10/2005

(Continued)

OTHER PUBLICATIONS

USPTO U.S. Appl. No. 12/432,434, filed Apr. 29, 2009, Inventors: William H. Havens, Timothy P. Meier, Ynjiun P. Wang.

(Continued)

*Primary Examiner* — William C Choi

(74) *Attorney, Agent, or Firm* — Heslin Rothenberg Farley & Mesiti P.C.

(57) ABSTRACT

Systems and methods for controlling a fluid lens in a data collection device. One or more micropump control systems are used to control one or more fluid lenses. The micropump control systems are used to change volume and/or pressure within the fluid lens system, changing the radius of curvature of the lens.

19 Claims, 19 Drawing Sheets

U.S. PATENT DOCUMENTS

| | | |
|---|---|---|
| 5,091,801 A | 2/1992 | Ebstein |
| 5,150,234 A | 9/1992 | Takahashi et al. |
| 5,305,356 A | 4/1994 | Brooks et al. |
| 5,389,222 A | 2/1995 | Shahinpoor |
| 5,396,144 A | 3/1995 | Gupta et al. |
| 5,684,637 A | 11/1997 | Floyd |
| 5,892,625 A | 4/1999 | Heimer |
| 5,917,657 A | 6/1999 | Kaneko et al. |
| 5,973,852 A | 10/1999 | Task |
| 6,081,388 A | 6/2000 | Widl et al. |
| 6,109,852 A | 8/2000 | Shahinpoor et al. |
| 6,188,526 B1 | 2/2001 | Sasaya et al. |
| 6,212,015 B1 | 4/2001 | Heimer |
| 6,368,954 B1 | 4/2002 | Lopatin et al. |
| 6,369,954 B1 | 4/2002 | Berge et al. |
| 6,376,971 B1 | 4/2002 | Pelrine et al. |
| 6,399,954 B1 | 6/2002 | Seto et al. |
| 6,437,925 B1 | 8/2002 | Nishioka et al. |
| 6,449,081 B1 | 9/2002 | Onuki et al. |
| 6,475,639 B2 | 11/2002 | Shahinpoor et al. |
| 6,529,620 B2 | 3/2003 | Thompson |
| 6,538,823 B2 | 3/2003 | Kroupenkine et al. |
| 6,542,309 B2 | 4/2003 | Guy |
| 6,545,815 B2 | 4/2003 | Kroupenkine et al. |
| 6,545,816 B1 | 4/2003 | Kroupenkine et al. |
| 6,586,859 B2 | 7/2003 | Kornbluh et al. |
| 6,628,040 B2 | 9/2003 | Pelrine et al. |
| 6,702,483 B2 | 3/2004 | Tsuboi et al. |
| 6,715,876 B2 | 4/2004 | Floyd |
| 6,734,903 B1 | 5/2004 | Takeda et al. |
| 6,747,806 B2 | 6/2004 | Gelbart |
| 6,762,210 B1 | 7/2004 | Oguro et al. |
| 6,806,621 B2 | 10/2004 | Heim et al. |
| 6,806,988 B2 | 10/2004 | Onuki et al. |
| 6,809,462 B2 | 10/2004 | Pelrine et al. |
| 6,812,624 B1 | 11/2004 | Pei et al. |
| 6,882,086 B2 | 4/2005 | Kornbluh et al. |
| 6,891,317 B2 | 5/2005 | Pei et al. |
| 6,934,090 B2 | 8/2005 | Nagaoka et al. |
| 6,936,809 B2 | 8/2005 | Viinikanoja et al. |
| 7,169,822 B2 | 1/2007 | Oguro et al. |
| 7,224,106 B2 | 5/2007 | Pei et al. |
| RE39,874 E | 10/2007 | Berge et al. |
| 7,301,708 B2 * | 11/2007 | Kuiper et al. ............ 359/665 |
| 7,416,125 B2 | 8/2008 | Wang et al. |
| 2003/0098952 A1 | 5/2003 | Goldfain et al. |
| 2004/0008853 A1 | 1/2004 | Pelrine et al. |
| 2004/0218283 A1 | 11/2004 | Nagaoka et al. |
| 2004/0227063 A1 | 11/2004 | Viinikanoja |
| 2004/0228003 A1 | 11/2004 | Takeyama et al. |
| 2005/0002113 A1 | 1/2005 | Berge |
| 2005/0014306 A1 | 1/2005 | Yao et al. |
| 2005/0100270 A1 | 5/2005 | O'Connor et al. |
| 2005/0212952 A1 | 9/2005 | Triteyaprasert et al. |
| 2005/0218231 A1 | 10/2005 | Massieu |
| 2006/0072915 A1 | 4/2006 | Onozawa |
| 2006/0076540 A1 | 4/2006 | Zama et al. |
| 2006/0086596 A1 | 4/2006 | Lee et al. |
| 2007/0063048 A1 | 3/2007 | Havens et al. |
| 2007/0080280 A1 | 4/2007 | Havens |
| 2007/0116858 A1 | 5/2007 | Benslimane et al. |
| 2008/0144185 A1 | 6/2008 | Wang et al. |
| 2008/0144186 A1 | 6/2008 | Feng et al. |
| 2008/0245872 A1 | 10/2008 | Good |
| 2009/0072037 A1 | 3/2009 | Good et al. |

FOREIGN PATENT DOCUMENTS

| | | |
|---|---|---|
| DE | 3424068 A1 | 5/1985 |
| DE | 3644225 A1 | 7/1987 |
| DE | 19706274 A1 | 8/1997 |
| DE | 102005013889 A1 | 10/2005 |
| EP | 1674892 A1 | 6/2006 |
| JP | 60114802 A | 6/1985 |
| JP | 62148903 A | 7/1987 |
| JP | 1140118 A | 6/1989 |
| JP | 02012518 A | 1/1990 |
| JP | 2002243918 A | 8/2002 |
| JP | 2005283750 A | 10/2005 |
| JP | 2006058405 A | 3/2006 |
| WO | WO-0058763 A1 | 10/2000 |
| WO | WO-0122148 A1 | 3/2001 |
| WO | WO-03044588 A1 | 5/2003 |
| WO | WO-03069380 A1 | 8/2003 |
| WO | WO-03071335 A2 | 8/2003 |
| WO | WO-2004027489 A1 | 4/2004 |
| WO | WO-2004038480 A1 | 5/2004 |
| WO | WO-2004050334 A1 | 6/2004 |
| WO | WO-2004051323 A1 | 6/2004 |
| WO | WO-2004072689 A2 | 8/2004 |
| WO | WO-2004077126 A1 | 9/2004 |
| WO | WO-2004097495 A1 | 11/2004 |
| WO | WO-2004099829 A2 | 11/2004 |
| WO | WO-2004099830 A1 | 11/2004 |
| WO | WO-2004099844 A1 | 11/2004 |
| WO | WO-2004099845 A1 | 11/2004 |
| WO | WO-2004102250 A1 | 11/2004 |
| WO | WO-2004102252 A1 | 11/2004 |
| WO | WO-2004102253 A1 | 11/2004 |
| WO | WO-2005003842 A1 | 1/2005 |
| WO | WO-2005003843 A1 | 1/2005 |
| WO | WO-2005006029 A1 | 1/2005 |
| WO | WO-2005006312 A2 | 1/2005 |
| WO | WO-2005069042 A1 | 7/2005 |
| WO | WO-2005069043 A1 | 7/2005 |
| WO | WO-2005069044 A1 | 7/2005 |
| WO | WO-2005071359 A1 | 8/2005 |
| WO | WO-2005073762 A1 | 8/2005 |

OTHER PUBLICATIONS

USPTO U.S. Appl. No. 12/432,517, filed Apr. 29, 2009, Inventors: William H. Havens, Timothy P. Meier.

USPTO U.S. Appl. No. 12/432,534, filed Apr. 29, 2009, Inventors: William H. Havens, Timothy P. Meier, Ynjiun P. Wang.

USPTO U.S. Appl. No. 12/540,075, filed Aug. 12, 2009, Inventors: William H. Havens, Timothy P. Meier.

Patent Cooperation Treaty, International Preliminary Report on Patentability, PCT/US2007/025707, dated Jun. 16, 2009 (11 pgs.).

Patent Cooperation Treaty, International Searching Authority, Written Opinion of the International Searching Authority, PCT/US2007/025707, dated Aug. 19, 2008 (9 pgs.).

USPTO U.S. Appl. No. 12/432,434, Filed: April 29, 2009.

USPTO U.S. Appl. No. 12/432,517, Filed: April 29, 2009.

USPTO U.S. Appl. No. 12/432,534, Filed: April 29, 2009.

USPTO U.S. Appl. No. 12/540,075, Filed: August 12, 2009.

International Search Report for International Patent Application No. PCT/US2007/025707 dated Aug. 19, 2008. 7 pages.

Written Opinion of the International Searching Authority for International Patent Application No. PCT/US2007/025707 dated Aug. 19, 2008. 10 pages.

Bal, Abdullah et al, Improved fingerprint identification with supervised filtering enhancement, Applied Optics, Feb. 10, 2005, pp. 647-654, vol. 44, No. 5, Optical Society of America.

Berge, B. et al, Variable focal lens controlled by an external voltage: An application of electrowetting, The European Physical Journal E, Dec. 1, 1999, pp. 159-163.

Kuiper, S. et al, Variable-focus lens for miniature cameras, Applied Physics Letters, Aug. 16, 2004, pp. 1128-1130, vol. 85, No. 7, American Institute of Physics.

Levy, Eli et al, Modulation transfer function of a lens measured with a random target method, Applied Optics, Feb. 1, 1999, pp. 679-683, vol. 38, No. 4, Optical Society of America.

Mugele, Frieder et al, Electrowetting: from basics to applications, Journal of Physics: Condensed Matter, J. Phys. Condens. Matter 17 (2005), pp. R705-R774, JOP Publishing Ltd., UK.

Narayanswamy, Ramkumar et al, Extending the imaging volume for biometric iris recognition, Applied Optics, Feb. 10, 2005, pp. 701-712, vol. 44, No. 5, Optical Society of America.

AMS-1000 Tunable lens unit, Varioptic, France, 1 page (http://www.varioptic.com/en/products.php?cat=PAMS—Sep. 14, 2005).

Conductive Elastomer Sheet Stock, Chomerics, 3 pages (www.chomerics.com) (Apr. 29, 1999).

ICM105T VGA CMOS image sensor (Data Sheet), IC Media, May 2004, 17 pages.

Introducing a CMOS Image Sensor Specifically Designed for Automotive Scene-Understanding Systems, Micron, 2 pages (www.micron.com—Oct. 2, 2004).

Liquid Lens Mimics the Human Eye (Press Release), Agency for Science, Technology and Research, 5 pages (Aug. 2005).

Philips' Fluid Lenses Bring Things into Focus, Philips' Fluid Lenses: Digital Photography Review, 3 pages (http://www.dpreview.com/news/article_print.asp?date=0403&article=04030302philips-fluid . . . —Sep. 14, 2005).

Smith, Warren J., Modern Optical Engineering The Design of Optical Sytems, McGraw-Hill Book Company, pp. 58-59, 4 pages (1966).

Arora, S., Ghosh, T., and Muth, J., "Dielectric elastomer based prototype fiber actuators", Sensors and Actuators A: Physical, 136:1, pp. 321-328 (May 2007).

Chronis N, Liu GL, Jeong K-H, and Lee LP, "Tunable liquid-filled microlens array integrated with microfluidic network", Optics Express 11(19):2370-2378 (Sep. 22, 2003).

Ghosh TK, Kotek R, and Muth J, "Development of layered functional fiber based micro-tubes", National Textile Center Annual Report 1-9 (Nov. 2005).

Pelrine R, Kornbluh RD, Pei Q, Stanford S, Oh S, Eckerle, J, Full RJ, Rosenthal MA, and Meijer K, 2002, "Dielectric elastomer artificial muscle actuators: toward biomimetic motion", Proc. SPIE 4695:126-137.

Ren H., Fox D., Anderson A., Wu B., and Wu S-T, "Tunable-focus liquid lens controlled using a servo motor", Optics Express 14(18):8031-8036 (Sep. 4, 2006).

Santiago-Alvarado A, Vazquez-Montiel S, González-Garcia J, García-Luna VM, Fernández-Moreno A, and Vera-Diaz E, 2006, "Analysis and design of an adaptive lens", Proceedings of SPIE Optics and Photonics 6288:62880S-1—62880S-8.

\* cited by examiner

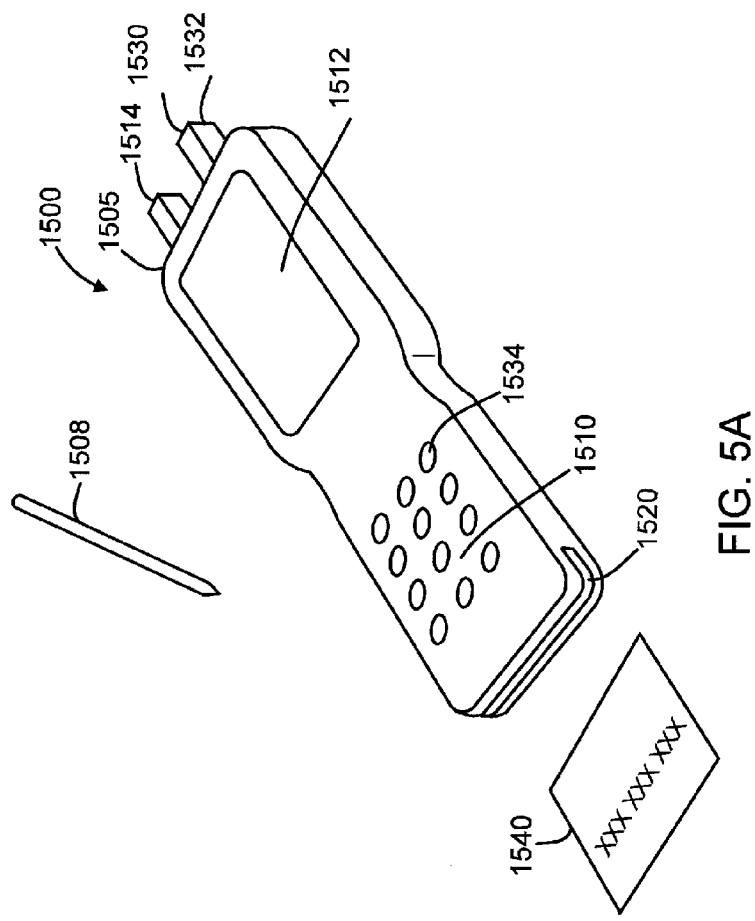
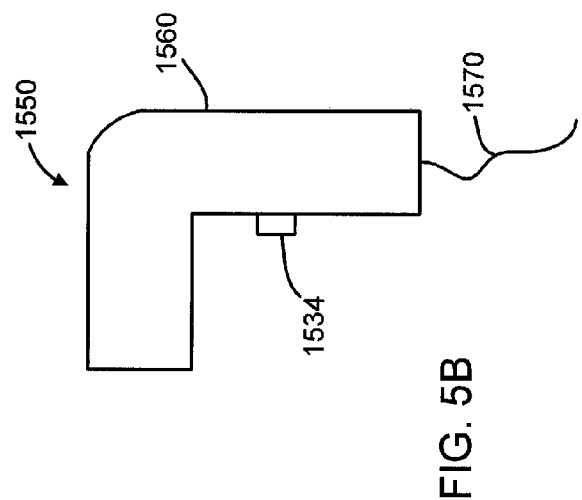
FIG. 5A
FIG. 5B

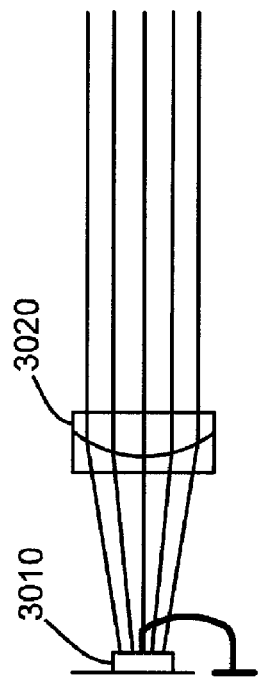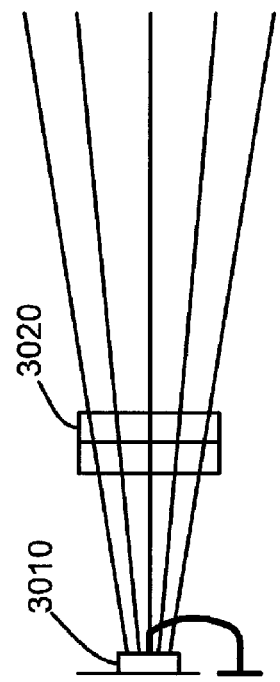

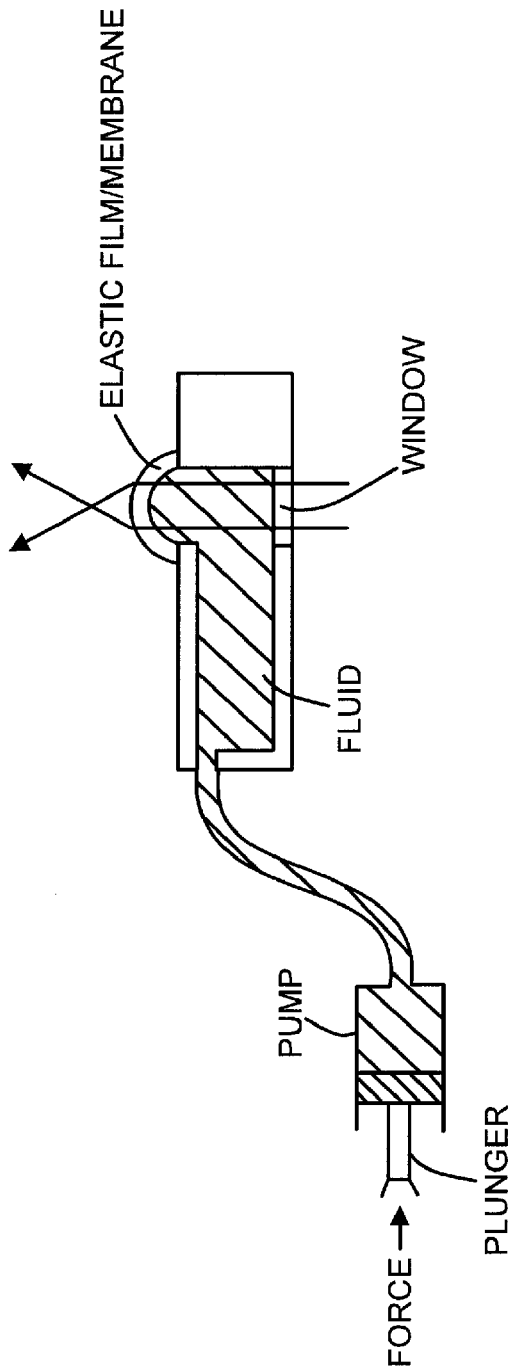
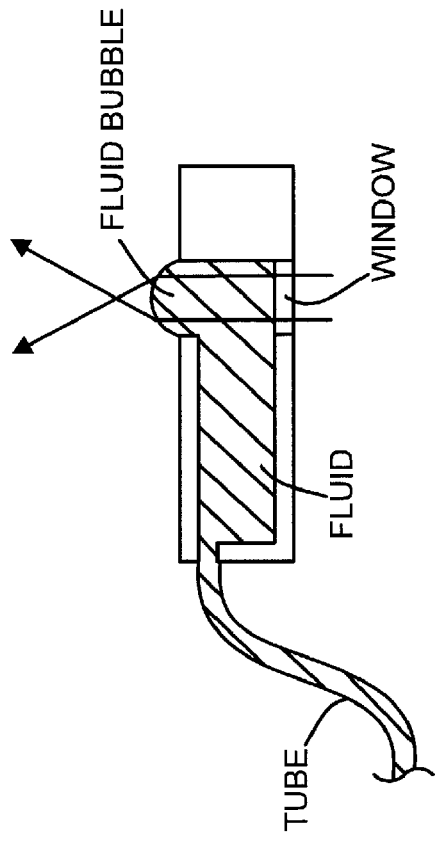
FIG. 18A
FIG. 18B

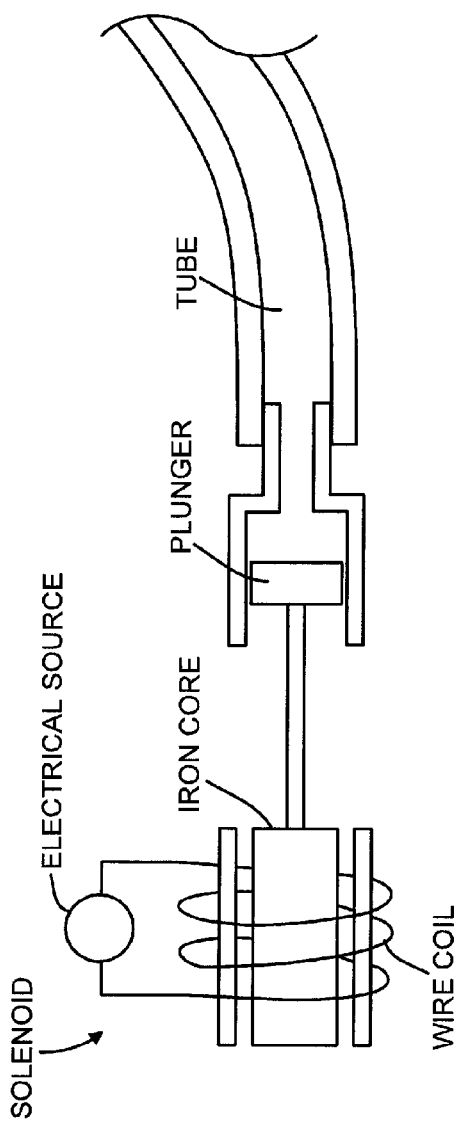
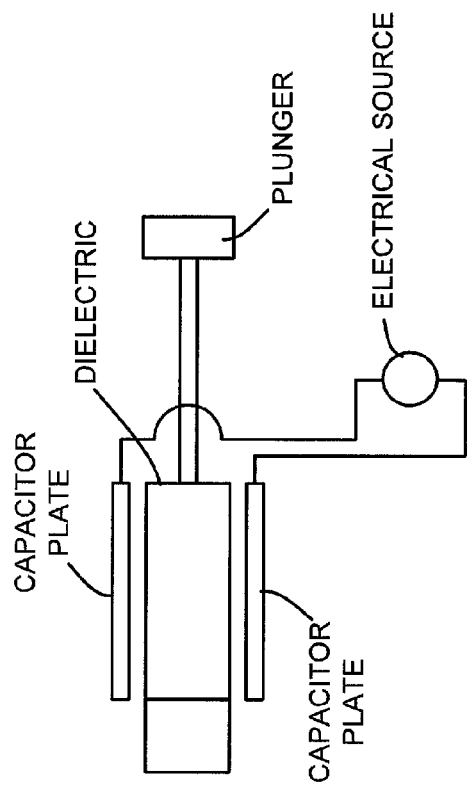
FIG. 18C
FIG. 18D

CONTROL SYSTEMS FOR ADAPTIVE LENS

CROSS-REFERENCE TO RELATED APPLICATIONS

This application is related to U.S. patent application Ser. No. 60/717,583, filed Sep. 14, 2005, entitled "Apparatus Comprising a Variable Lens"; U.S. patent application Ser. No. 60/725,531, filed Oct. 11, 2005, entitled "Data Reader Apparatus Having an Adaptive Lens"; co-pending U.S. patent application Ser. No. 11/521,142, filed Sep. 14, 2006, entitled "Apparatus Comprising a Variable Lens"; and U.S. patent application Ser. No. 60/778,569, filed Mar. 2, 2006, entitled "Control systems for adaptive lens", the disclosures of which are hereby incorporated in their entireties by reference thereto.

FIELD OF THE INVENTION

The invention relates to adaptive lenses in general, adaptive lenses having auto-calibration and auto-adjustment features, and devices that use such adaptive lenses.

More particularly, the present invention is directed to control systems for the control of adaptive lenses.

BACKGROUND OF THE INVENTION

In brief, a fluid lens comprises an interface between two fluids having dissimilar optical indices. The shape of the interface can be changed by the application of external forces so that light passing across the interface can be directed to propagate in desired directions. As a result, the optical characteristics of a fluid lens, such as whether the lens operates as a diverging lens or as a converging lens, and its focal length, can be changed in response to the applied forces.

Fluid lens technology that employs electrical signals to control the operation of the fluid lens has been described variously in U.S. Pat. No. 2,062,468 to Matz, U.S. Pat. No. 6,399,954 to Berge et al., U.S. Pat. No. 6,449,081 to Onuki et al., U.S. Pat. No. 6,702,483 to Tsuboi et al., and U.S. Pat. No. 6,806,988 to Onuki et al., in U.S. Patent Application Publication Nos. 2004/0218283 by Nagaoka et al., 2004/0228003 by Takeyama et al., and 2005/0002113 by Berge, as well as in several international patent documents including WO 99/18456, WO 00/58763 and WO 03/069380.

Additional methods of controlling the operation of fluid lenses include the use of liquid crystal material (U.S. Pat. No. 6,437,925 to Nishioka), the application of pressure (U.S. Pat. No. 6,081,388 to Widl), the use of elastomeric materials in reconfigurable lenses (U.S. Pat. No. 4,514,048 to Rogers), the uses of micro-electromechanical systems (also known by the acronym "MEMS") (U.S. Pat. No. 6,747,806 to Gelbart), the use of stack-type piezoelectric actuators to vary the focus of the lens member to compensate for temperature fluctuations (U.S. Pat. No. 6,188,526 to Sasaya et al.), the use of piezoelectric material to deform a variable focus lens (Japanese Patent No. JP2002243918), and the use of piezoelectric element in contact with a fluid such that the element changes dimensions in response to changes in voltage, changing the fluid pressure and altering the radius of curvature of an associated transparent membrane (GB Patent 1,327,503); the disclosures of the foregoing are hereby incorporated in their entireties herein.

There is a need for improved systems and methods for using fluid lenses in present day systems.

In the drawings, while every effort has been made to use like numerals to indicate like parts throughout the various views, the right is reserved to make corrections should errors become apparent.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention.

FIGS. 5a and 1b are drawings of hand held readers that embody features of the invention;

FIGS. 10A and 10B are diagrams that show an LED die emitting energy in a forward direction through a fluid lens, according to principles of the invention.

FIGS. 18A-18D present further lens control configurations.

DETAILED DESCRIPTION OF THE INVENTION

Figure 1A:
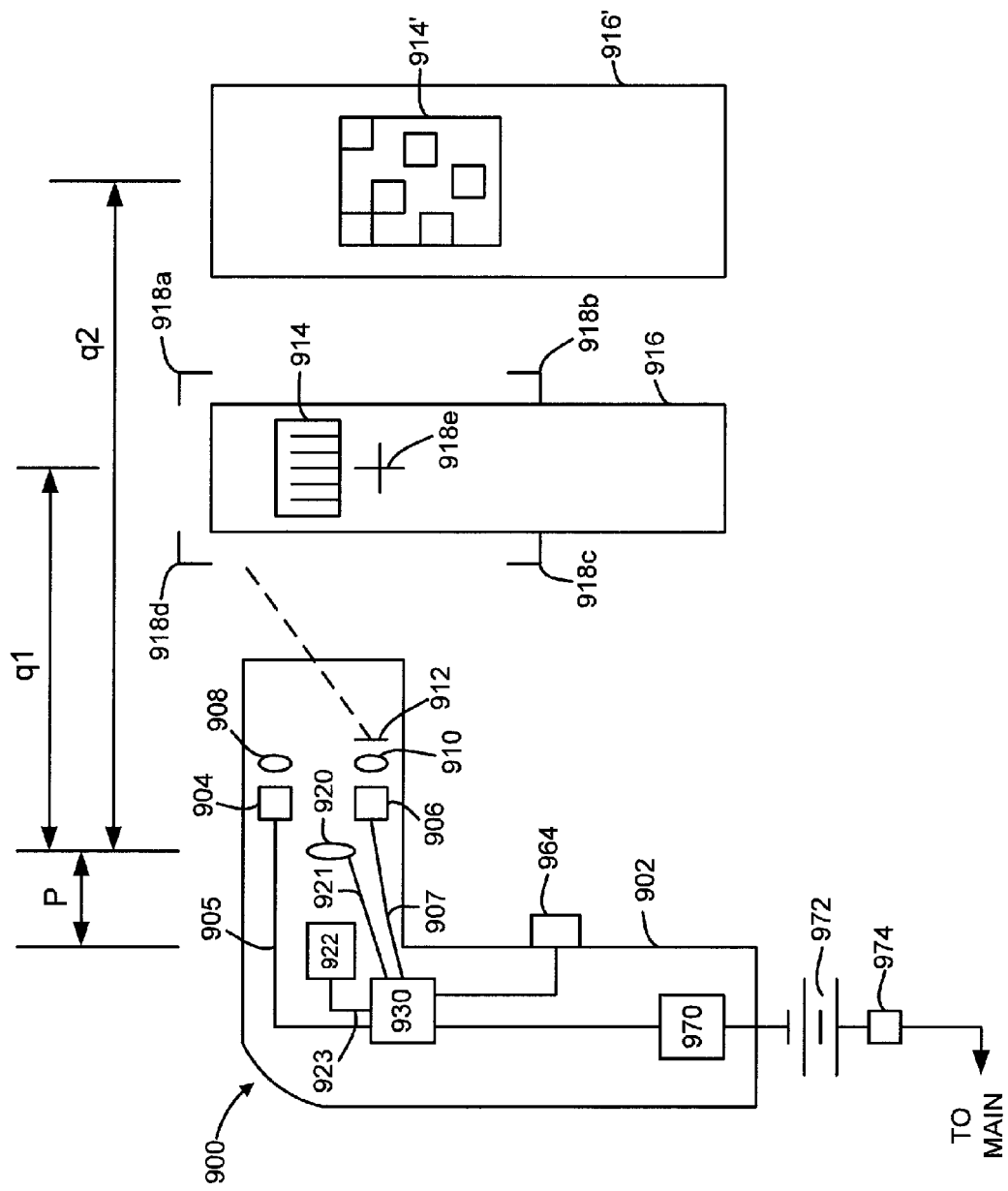
FIG. 1A is a diagram showing a reader embodying features of the invention.

The present application is directed to apparatus and methods useful for imaging, capturing, decoding and utilizing information represented by encoded indicia such as bar codes (for example, 1D bar codes, 2D bar codes, and stacked bar codes), optically recognizable characters (for example printed, typed, or handwritten alphanumeric symbols, punctuation, and other OCR symbols having a predefined meaning), as well as selected graphical images such as icons, logos, and pictographs. The apparatus and methods involve the use of one or more fluid lens components with data collection devices, which include corded and cordless bar code scanners, portable data terminals, transaction terminals (including price checkers), and bar code verifiers, to accomplish such tasks as imaging barcodes and other optically readable information, including focusing on images of interest, and improving image quality by removing artifacts such as jitter introduced by a user who is manually operating a reader of the invention.

U.S. Pat. No. 2,062,468 to Matz, U.S. Pat. No. 4,514,048 to Rogers, U.S. Pat. No. 6,081,388 to Widl, U.S. Pat. No. 6,369,954 to Berge et al., U.S. Pat. No. 6,437,925 to Nishioka, U.S. Pat. No. 6,449,081 to Onuki et al., U.S. Pat. No. 6,702,483 to Tsuboi et al., U.S. Pat. No. 6,747,806 to Gelbart, and U.S. Pat. No. 6,806,988 to Onuki et al., U.S. Patent Application Publication Nos. 2004/0218283 by Nagaoka et al., 2004/0228003 by Takeyama et al., and 2005/0002113 by Berge, and international patent publications WO 99/18546, WO 00/58763 and WO 03/069380 are each individually incorporated by reference herein in its entirety. The aforementioned published patent documents describe various embodiments and applications relating generally to fluid lens technology.

While the operation of the device has been described as adaptable primarily to an alteration in the surface curvature of the liquid lens, it is to be understood that there are other associated effects which may contribute largely to the successful operation of the system, and may be important in the modulation of some frequencies. The electrocapillary rise and fall of the fluid in the slot where the device is employed, for example, may be employed to augment the modulating effect of the alteration in the lenticular structure of the fluid. This capillary rise and fall is, however, probably relatively slow, and where the device is used as a light valve with high frequencies, it probably has little effect.

Where a liquid is employed in the device which absorbs certain wave lengths of the transmitted beam, the device may be effective to alter the intensity of the beam because of the alteration in the effective thickness of the film of liquid interposed in the path of the beam at the center of the slot with the impressment of the electric potential.

The fluids employed in the lens are light-transmitting. A wide variety of liquids may be usable, such as for example as methyl alcohol, ethyl alcohol, ether, carbon tetrachloride, methyl acetate, distilled water, glycerine, nitrobenzene, and some oils.

The device which bas been described and which has been termed a liquid lens of variable focal length has many other applications. It may be employed, for example, as an electrostatic voltmeter, as the alteration in the divergence or convergence of a translated beam is a function of the intensity of the impressed field. The device may be employed in connection with suitable apparatus for the transmission of audible or other signals over a beam of light. When the device is employed in connection with transmission of audible signs it may be said to modulate the beam of light at audible frequencies, and where such an expression is used in the claims it should be so interpreted. It is admirably adapted for use in sound-recording on motion picture film.

Although Matz describes his fluid lens as being responsive to "an electric potential," it is clear that different fluid lens technologies can be used that respond to signals that are voltages (electric potentials, or electric potential differences), as well as signals that can be characterized by other electrical parameters, such as electric current or electric charge (the time integral of electric current). One can also design lenses that have adjustable behavior based on the interaction of light with two or more fluids (or a fluid and vacuum) having differing optical indices that operate in response to other applied signals, such as signals representing mechanical forces such as pressure (for example hydrodynamic pressure), signals representing mechanical forces such as tensile stress (such as may be used to drive elastomeric materials in reconfigurable lenses), and signals representing a combination of electrical and mechanical forces (such as may be used to drive microelectromechanical systems). For the purposes of the present disclosure, the general term "fluid lens control signal" without more description will be used to denote an applied signal for driving any type of fluid (or reconfigurable) lens that responds to the applied signal by exhibiting adjustable behavior based on the interaction of light with two or more fluids (or a fluid and vacuum) having differing optical indices.

We now describe apparatus and methods of operation that embody various features and aspects of the invention, in the form of readers having the capability to obtain images, and to detect, analyze, and decode such images. In particular, the readers of the invention can in some embodiments be hand held, portable, apparatus that can image encoded indicia, such as bar codes of a variety of types (1D, 2D, matrix, stacked 1D, and other bar codes), and encoded symbols such as handwritten, printed, and typed characters (for example using optical character recognition methods), as well as imaging surfaces or objects that are amenable to being identified using optical illumination.

Figure 1B:
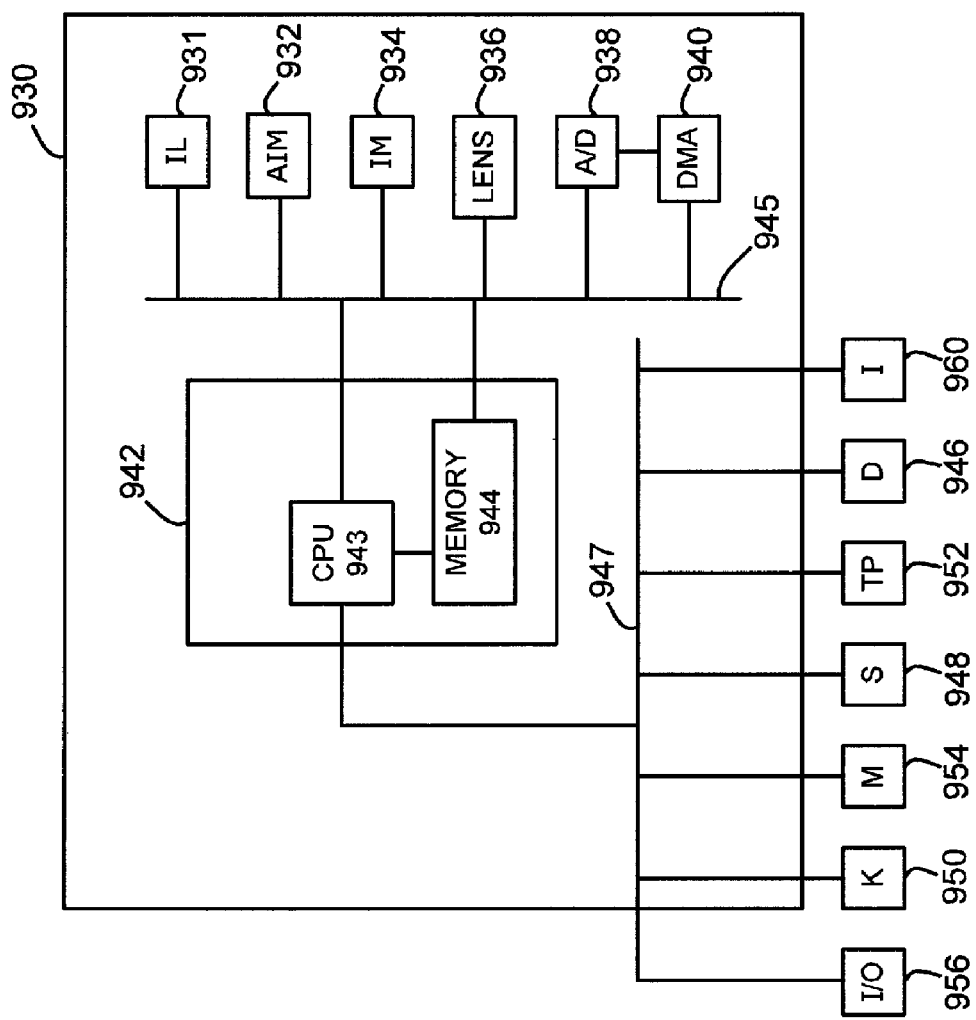
FIG. 1B is a diagram showing the control circuitry of the reader of FIG. 1A in greater detail, according to principles of the invention.

FIG. 1A is a diagram showing a reader 900, such as a bar code scanner, embodying features of the invention. The reader 900 comprises various optical components and components of hardware and software for controlling the operation of the reader 900 and for analyzing an image acquired by the reader 900. FIG. 1B is a diagram showing the control circuitry of the reader of FIG. 1A in greater detail. In FIG. 1A, a case 902 is shown which in principle can be any convenient enclosure or frame for supporting the various components in suitable mutual orientation, and in some embodiments is a case adapted to be held in a hand of a user, as described in greater detail hereinbelow in conjunction with FIGS. 5a and 5b. The reader 900 comprises sources of illumination 904, 906 that can be operated in various circumstances to illuminate a target and to provide an aiming signal. The illumination source 904 is in general a source comprising one or more light sources such as lamps or LEDs that provide illumination at a convenient wavelength, such as red or green illumination, for illuminating a target whose image is to be acquired. The aimer source 906 in some embodiments is a second LED with appropriate imaging optics to image a slit, or alternately is a laser diode operating at a different wavelength from the illumination source 904 (for example, red illumination), so that it is easily distinguished therefrom. The aimer source 906 is used by an operator of the reader 900 to ascertain what the reader is aimed at. Optics 908 are provided for distributing the illumination from illumination source 904 in a pattern calculated to illuminate a target. In a preferred embodiment the target is illuminated optimally. A collimation lens 910 and a diffractive element 912 are optionally provided to collimate the light from the aimer source 906, and to spread or diffract the light from the aimer source 906 in a predefined pattern, respectively. As can be seen in FIG. 1A, an object 914 to be imaged is situated on an object plane 916 located at a distance $q_1$ from the reader 900. The object 914 is for example a bar code affixed to a surface, namely the object plane 916. For purposes of discussion, there is also shown in FIG. 1A a second object plane 916' located at a greater distance $q_2$ from the reader 900, and having thereon an object 914' (which can also be a bar code). The surface 916, 916' is preferably illuminated, either by light from the illumination source 904, or by ambient light, or a combination thereof. As can be seen in FIG. 1A, the aimer 906, the collimation lens 910 and the diffractive element 912 in combination provide a locator pattern 918, comprising 5 elements 918a-918e in FIG. 1A, that identify for a user where the reader 900 is aimed, so that a desired target can be made to fall within the aiming area of the reader 900. Light reflected from the target (or alternatively, light generated at the target) is captured by the reader using a lens 920, which in some embodiments comprises a fluid lens and possibly one or more fixed lenses, and is conveyed via the fluid lens to an imager 922. The imager 922 in various embodiments is a 1D or 2D semiconductor array sensor, constructed using any convenient processing technology, such as a CMOS sensor, a CCD sensor, or the like. The imager 922 converts the optical signals that it receives into electrical signals that represent individual pixels of the total image, or frame, or a portion thereof. In various embodiments, the imager can be any of a color CCD imager and a color CMOS imager.

The reader 900 also includes various hardware components, shown in a single control element 930 for controlling and for acquiring signals from the reader 900 in FIG. 1A. The details of control element 930 are shown in FIG. 1B. An illumination control 931 is provided to control the intensity and timing of illumination provided by the illumination source 904. The illumination control 931 is in electrical communication with illumination source 904 by way of a cable 905. An aimer control 932 is provided to control the intensity and timing of illumination provided by the aimer source 906. The aimer control 932 is in electrical communication with aimer source 906 by way of a cable 907. An imager control 934 is provided to control the timing and operation of the imager 922, for example by providing clocking signals to operate the imager, reset signals, start and stop signals for capturing illumination, and synchronization signals for providing electrical output as data indicative of the intensity of illumination received at any pixel of the imager array 922, which data may be provided as analog or as digital data. The imager control 934 is in electrical communication with imager 922 by way of a cable 923. A lens controller 936 is provided to control the behavior of the fluid lens 920. The lens controller 938 and the fluid lens 920 are in electrical communication by way of a cable 921.

An analog-to-digital converter 938 is provided for converting analog signals output by the imager 922 to digital signals. In some embodiments, a DMA controller 940 is provided to allow direct transfer of digital data to a memory for storage. In general, any and all of illumination control 930, aimer control 932, imager control 934, A/D 938 and DMA 940 are connected to a general purpose programmable computer 942 by way of one or more buses 945, which buses 945 may be serial buses or parallel buses as is considered most convenient and advantageous. The general purpose programmable computer 942 comprises the usual components, including a CPU 943 which can in some embodiments be a microprocessor, and memory 944 (for example semiconductor memory such as RAM, ROM, magnetic memory such as disks, or optical memory such as CD-ROM). The general purpose computer can also communicate via one or more buses 947 with a wide variety of input and output devices. For example, there can be provided any or all of an output device 946 such as a display, a speaker 948 or other enunciator, devices for inputting commands or data to the computer such as a keyboard 950, a touchpad 952, a microphone 954, and bidirectional devices such as one or more I/O ports 956 which can be hardwired (i.e., serial, parallel, USB, firewire and the like) or can be wireless (i.e., radio, WiFi, infra-red, and the like). The general purpose programmable computer 942 can also comprise, or can control, indicators 960 such as LEDs for indicating status or other information to a user.

As shown in FIG. 1A, the reader 900 and/or the general purpose computer 942 (as shown in FIG. 1B) can comprise one or more trigger switches 964 that allow a user to indicate a command or a status to the reader 900. In addition, the entire system is provided with electrical power by the use of one or more of a power supply 970, batteries 972 and a charger 974. Any convenient source of electrical power that can be used to operate the reader 900 and its associated general purpose programmable computer 942 (as shown in FIG. 1B) is contemplated, including the conventional electrical grid (which can be accessed by connection to a conventional wall plug), and alternative power sources such as emergency generators, solar cells, wind turbines, hydroelectric power, and the like.

As may be seen from FIG. 1A, the distance at which the reader of the invention can operate, or equivalently, a focal length of the optical system of the reader, can vary as the distance q from the lens to the object to be imaged varies. The focal length for a specific geometrical situation can be determined from the formula $$1/f=1/p+1/q$$

in which f is the focal length of a lens, p is the distance from the lens to a surface at which a desired image is observed (such as an imaging sensor or a photographic film), and q is a distance between the lens and the object being observed.

Consider the two objects situated at a nearer distance $q_1$, and a farther distance $q_2$ from the reader lens (e.g., $q_2>q_1$). In a system that is less expensive and more convenient to construct, the distance p (from the lens 920 to the imaging sensor 922) is fixed. One can image objects lying at the distance $q_1$, from the lens with a focal length given by $1/f_1=1/p+1/q_1$, and one can image objects lying at the distance $q_2$ from the lens with a focal length given by $1/f_2=1/p+1/q_2$. Since $q_2>q_1$, and p is constant, we have $f_1<f_2$. In particular, for a reader comprising a fluid lens that can provide a minimum focal length of $f_1$ and a maximum focal length of $f_2$, for a fixed value of p, one would have the ability to observe in proper focus objects at distances ranging at least from $q_1$ to $q_2$, without consideration for issues such as depth of field at a particular focal length setting of the lens. By way of example, $q_1$ might be a short distance such as 4 inches (approximately 10 cm) so that one can image a target object having much detail (such as a high density bar code) with recovery or decoding of all of the detail present in the object. On the other hand, $q_2$ might be a longer distance, such as 12 inches (approximately 30 cm) or more, whereby a reader can image an object at longer distance with lesser density (e.g., fewer pixels of resolution per unit of length or area observed at the target object). Accordingly, a reader of the invention comprising a particular imaging sensor can be configured to perform at either extreme of high density/short distance or of low density/long distance (or any variant intermediate to the two limits) by the simple expedient of controlling the focal length of the fluid lens such that an object at the intended distance d in the range $q_2 \geq d \geq q_1$ will be imaged correctly.

Figure 2:
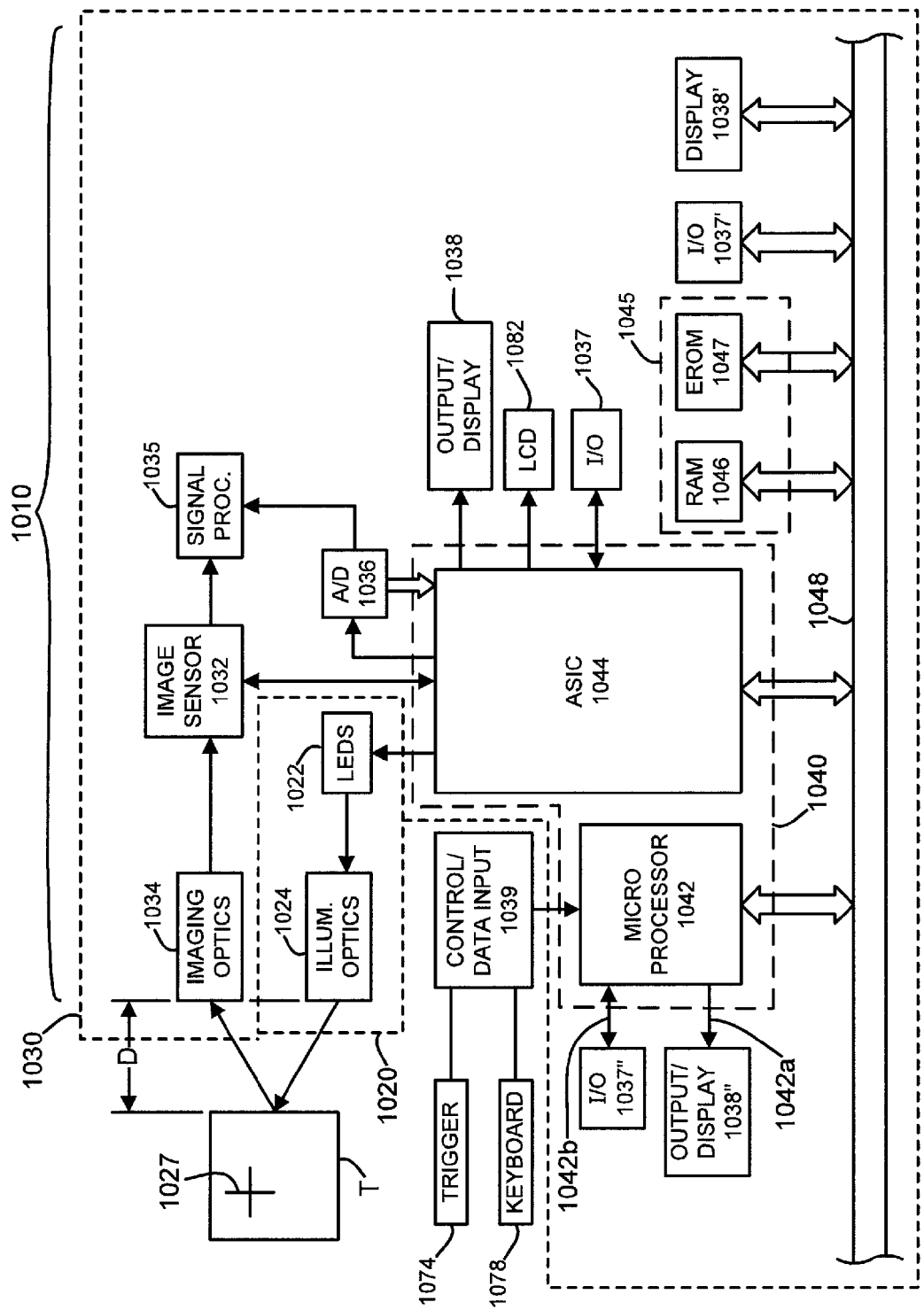
FIG. 2 is a block diagram of an optical reader showing a general purpose microprocessor system that is useful with various embodiments of the invention.

FIG. 2 is a block diagram of an optical reader showing a general purpose microprocessor system that is useful with various embodiments of the invention. Optical reader 1010 includes an illumination assembly 1020 for illuminating a target object T, such as a 1D or 2D bar code symbol, and an imaging assembly 1030 for receiving an image of object T and generating an electrical output signal indicative of the data optically encoded therein. Illumination assembly 1020 may, for example, include an illumination source assembly 1022, together with an illuminating optics assembly 1024, such as one or more lenses, diffusers, wedges, reflectors or a combination of such elements, for directing light from light source 1022 in the direction of a target object T. Illumination assembly 1020 may comprise, for example, laser or light emitting diodes (LEDs) such as white LEDs or red LEDs. Illumination assembly 1020 may include target illumination and optics for projecting an aiming pattern 1027 on target T. Illumination assembly 1020 may be eliminated if ambient light levels are certain to be high enough to allow high quality images of object T to be taken. Imaging assembly 1030 may include an image sensor 1032, such as a 1D or 2D CCD, CMOS, NMOS, PMOS, CID OR CMD solid state image sensor, either black-and-white or color, together with an imaging optics assembly 1034 for receiving and focusing an image of object T onto image sensor 1032. The array-based imaging assembly shown in FIG. 2 may be replaced by a laser array based scanning assembly comprising at least one laser source, a scanning mechanism, emit and receive optics, at least one photodetector and accompanying signal processing circuitry.

A partial frame clock out mode is readily implemented utilizing an image sensor which can be commanded by a control module to clock out partial frames of image data or which is configured with pixels that can be individually addressed. Using CMOS fabrication techniques, image sensors are readily made so that electrical signals corresponding to certain pixels of a sensor can be selectively clocked out without clocking out electrical signals corresponding to remaining pixels of the sensor, thereby allowing analysis of only a partial frame of data associated with only a portion of the full imager field of view. CMOS image sensors are available from such manufacturers as Symagery, Omni Vision, Sharp, Micron, STMicroelectronics, Kodak, Toshiba, and Mitsubishi. A partial frame clock out mode can also be carried out by selectively activating a frame discharge signal during the course of clocking out a frame of image data from a CCD image sensor. A/D 1036 and signal processor 1035 may individually or both optionally be integrated with the image sensor 1032 onto a single substrate.

Optical reader 1010 of FIG. 2 also includes programmable control circuit (or control module) 1040 which preferably comprises an integrated circuit microprocessor 1042 and an application specific integrated circuit (ASIC 1044). The function of ASIC 1044 could also be provided by a field programmable gate array (FPGA). Processor 1042 and ASIC 1044 are both programmable control devices which are able to receive, to output and to process data in accordance with a stored program stored in memory unit 1045 which may comprise such memory elements as a read/write random access memory or RAM 1046 and an erasable read only memory or EROM 1047. Other memory units that can be used include EPROMs and EEPROMs. RAM 1046 typically includes at least one volatile memory device but may include one or more long term non-volatile memory devices. Processor 1042 and ASIC 1044 are also both connected to a common bus 1048 through which program data and working data, including address data, may be received and transmitted in either direction to any circuitry that is also connected thereto. Processor 1042 and ASIC 1044 differ from one another, however, in how they are made and how they are used. The processing module that is configured to extract information encoded by the encoded indicium employs some or all of the capabilities of processor 1042 and ASIC 1044, and comprises the hardware and as necessary, software and or firmware, required to accomplish the extraction task, including as necessary decoding tasks to convert the raw data of the image to the information encoded in the encoded indicium.

More particularly, processor 1042 is preferably a general purpose, off-the-shelf VLSI integrated circuit microprocessor which has overall control of the circuitry of FIG. 2, but which devotes most of its time to decoding image data stored in RAM 1046 in accordance with program data stored in EROM 1047. ASIC 1044, on the other hand, is preferably a special purpose VLSI integrated circuit, such as a programmable logic array or gate array that is programmed to devote its time to functions other than decoding image data, and thereby relieves processor 1042 from the burden of performing these functions.

The actual division of labor between processors 1042 and 1044 will naturally depend on the type of off-the-shelf microprocessors that are available, the type of image sensor which is used, the rate at which image data is output by imaging assembly 1030, etc. There is nothing in principle, however, that requires that any particular division of labor be made between processors 1042 and 1044, or even that such a division be made at all. This is because special purpose processor 1044 may be eliminated entirely if general purpose processor 1042 is fast enough and powerful enough to perform all of the functions contemplated by the present invention. It will, therefore, be understood that neither the number of processors used, nor the division of labor there between, is of any fundamental significance for purposes of the present invention.

With processor architectures of the type shown in FIG. 2, a typical division of labor between processors 1042 and 1044 will be as follows. Processor 1042 is preferably devoted primarily to such tasks as decoding image data, once such data has been stored in RAM 1046, recognizing characters represented in stored image data according to an optical character recognition (OCR) scheme, handling menuing options and reprogramming functions, processing commands and data received from control/data input unit 1039 which may comprise such elements as a trigger 1074 and a keyboard 1078 and providing overall system level coordination.

Processor 1044 is preferably devoted primarily to controlling the image acquisition process, the A/D conversion process and the storage of image data, including the ability to access memories 1046 and 1047 via a DMA channel. The A/D conversion process can include converting analog signals to digital signals represented as 8-bit (or gray scale) quantities. As A/D converter technology improves, digital signals may be represented using more that 8 bits. Processor 1044 may also perform many timing and communication operations. Processor 1044 may, for example, control the illumination of LEDs 1022, the timing of image sensor 1032 and an analog-to-digital (A/D) converter 1036, the transmission and reception of data to and from a processor external to reader 1010, through an RS-232, a network such as an Ethernet or other packet-based communication technology, a serial bus such as USB, and/or a wireless communication link (or other) compatible I/O interface 1037. Processor 1044 may also control the outputting of user perceptible data via an output device 1038, such as a beeper, a good read LED and/or a display monitor which may be provided by a liquid crystal display such as display 1082. Control of output, display and I/O functions may also be shared between processors 1042 and 1044, as suggested by bus driver I/O and output/display devices 1037' and 1038' or may be duplicated, as suggested by microprocessor serial I/O ports 1042A and 1042B and I/O and display devices 1037" and 1038". As explained earlier, the specifics of this division of labor is of no significance to the present invention.

Figure 3:
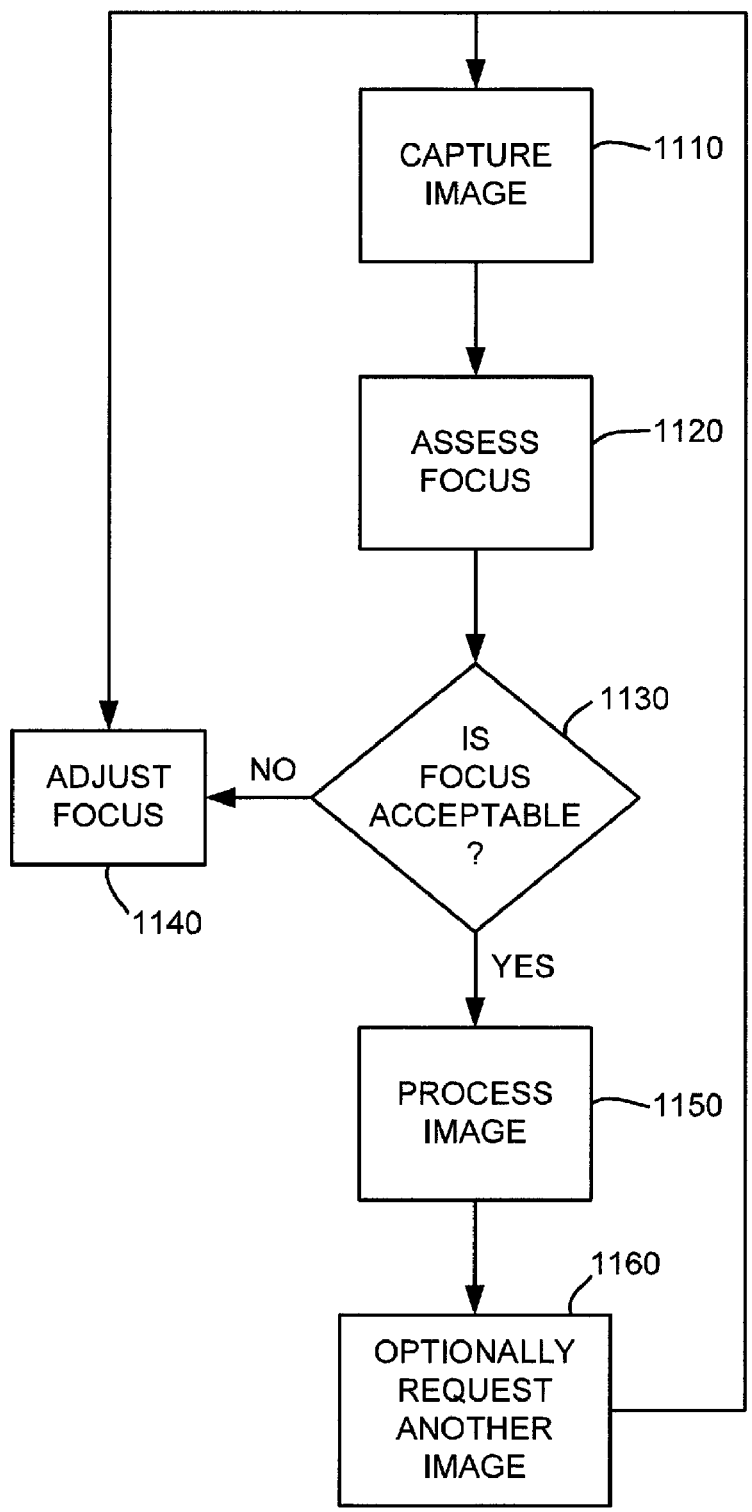
FIG. 3 is a flow chart showing a process for operating a system having an adjustable focus system comprising feedback, according to principles of the invention.

FIG. 3 is a flow chart 1100 showing a process for operating a system having an adjustable focus system comprising feedback, for example a system having components as described in FIG. 1A. The process begins at step 1110, where a command to capture an image is generated, for example by a user depressing a trigger, or by an automated system issuing a capture image command in response to a specified condition, such as an object being sensed as coming into position for imaging. Once an image is captured at step 1110, the image focus is assessed, as indicated at step 1120. Focus assessment can comprise comparison of the image quality with a specified standard or condition, such as the sharpness of contrast at a perceived edge of a feature in the image, or other standards.

Another procedure for performing an autofocus operation using a flatness metric includes the following steps:

1. capturing a gray scale image (i.e., capture an image with the hand held reader and digitize the image using at least two bit resolution, or at least 4 discrete values);
2. optionally sampling the gray scale image (i.e., extract from the image a line or a series of points, or alternatively, the sampled image can be the captured image if it is a windowed frame comprising image data corresponding to selectively addressed pixels);
3. creating a histogram by plotting number of occurrences of data points having a particular gray scale value, for example using the X axis to represent gray scale values and the Y axis to represent frequency of occurrence;
4. processing the histogram to provide a flatness measurement as output;
5. determining a focus level (or quality of focus) based on the flatness measurement; and
6. in the event that the quality of focus as determined from the flatness metric is less than desired, changing the focus and repeating steps 1 through 5.

The flatness of an image refers to the uniformity of the distribution of different gray scale values in the histogram. A flat distribution is one with little variation in numbers of observations at different gray scale values. In general, poorly focused images will be "flatter" than better focused images, i.e. there will be a relatively even incidence of gray scale values over the range of gray scale values. Generally, a histogram for a well focused image has many pixels with high gray scale values, many pixels with low gray scale values, and few pixels in the middle. The use of historical information for various types of images, such as bar codes, including information encoded in look up tables, or information provided using the principles of fuzzy logic, are contemplated At step 1130, the outcome of the focus assessment is compared to an acceptable criterion, such as sharpness (or contrast change) of a specified amount over a specified number of pixels. Images that are digitized to higher digital resolutions (e.g., using a range defined by a larger number of bits) may support more precise determinations of acceptable focus. If the result of the assessment of focus is negative, the process proceeds to step 1140, where the focus of the lens 920 of FIG. 1A, is modified. After adjusting the focus, the operation of the process returns to step 1110, and a new image is captured, and is assessed. When an image is captured that is found to have suitable focus, the process moves from step 1130 to step 1150, wherein the image with suitable focal properties is processed, and a result is made available to a user or to the instrumentality that commanded the capturing of the image, and/or the result is stored in a memory. Optionally, as indicated at step 1160, the system can be commanded to obtain another image, that is to loop back to the step 1110, and to repeat the process again.

Figure 4:
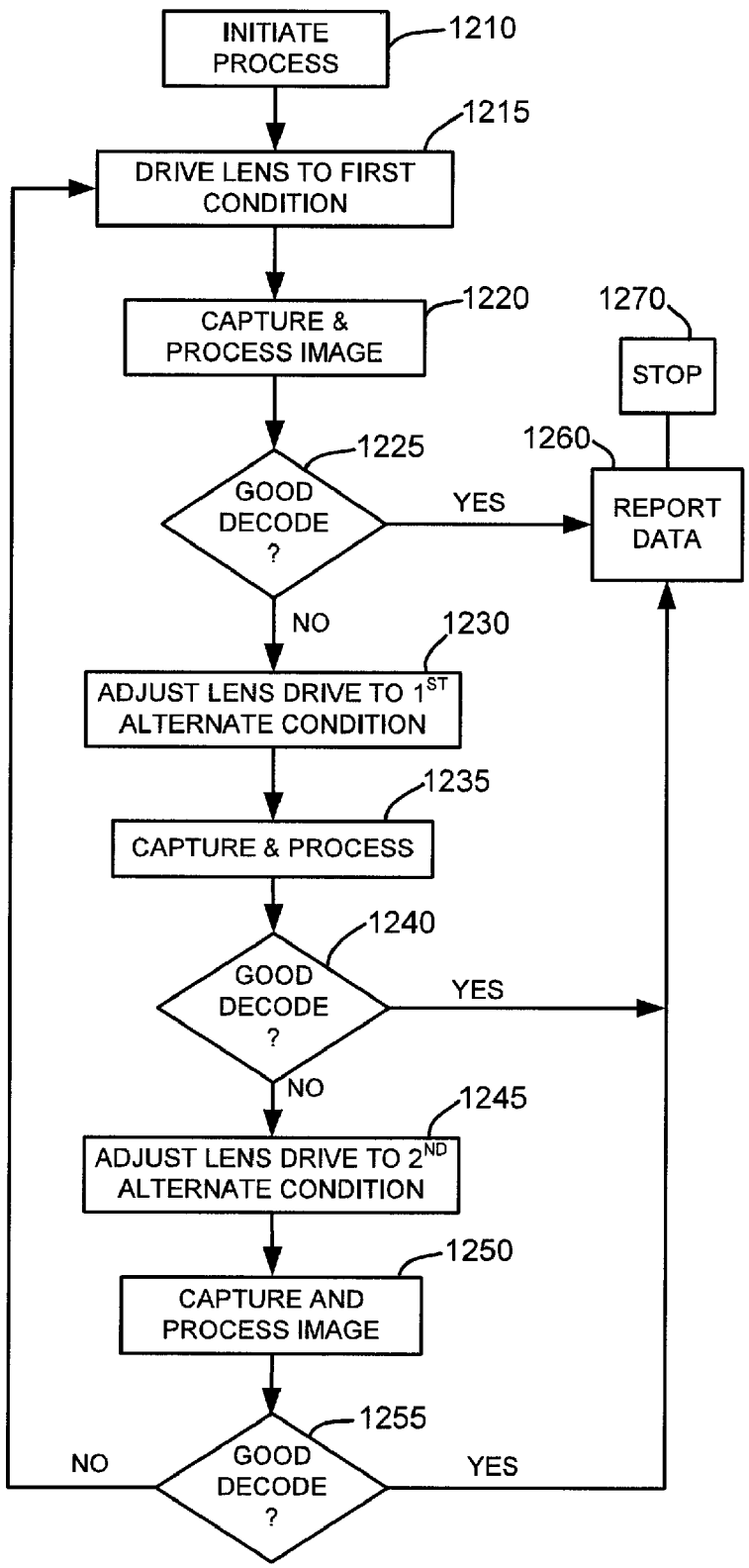
FIG. 4 is a flow chart showing a process for operating a system having an adjustable focus system that does not comprise feedback, according to principles of the invention.

FIG. 4 is a flow chart showing a process for operating a system having an adjustable focus system that does not comprise feedback. At step 1210 a command to capture an image is generated, for example by a user depressing a trigger, or by an automated system issuing a capture image command in response to a specified condition, such as an object being sensed as coming into position for imaging. At step 1215, the lens 920 is driven with a first fluid lens control signal corresponding to a first condition, such as a default condition, for example causing the lens 920 to operate by approximation with a focus position $q_1$ of 10 cm. Using this focus condition, an image is captured and processed at step 1220. At step 1225, the information retrieved from the captured image is examined to determine if a valid decoding of a bar code has been achieved. If the decoding is valid, the information or data represented by the decoded image is reported as indicated at step 1260, and the process stops, as indicated at step 1270. A later command to repeat the process can be given as may be necessary or advantageous.

If at step 1225 it is determined that a good decode has not been achieved, the process continues to step 1230, at which time the fluid lens control signal applied to the lens 920 is adjusted to a first alternative value, for example causing the lens 920 to focus by approximation at a distance $q_2$ of 30 cm. Using this focus condition, an image is captured and processed at step 1235. At step 1240, the information retrieved from the captured image is examined to determine if a valid decoding of a bar code has been achieved. If the decoding is valid, the information or data represented by the decoded image is reported as indicated at step 1260, and the process stops, as indicated at step 1270.

If at step 1240 it is determined that a good decode has not been achieved, the process continues to step 1245, at which time the fluid lens control signal applied to the lens 920 is adjusted to a second alternative value, for example causing the lens 920 to focus by approximation at a distance $q_3$ of 100 cm. Using this focus condition, an image is captured and processed at step 1250. At step 1255, the information retrieved from the captured image is examined to determine if a valid decoding of a bar code has been achieved. If the decoding is valid, the information or data represented by the decoded image is reported as indicated at step 1260, and the process stops, as indicated at step 1270. If a valid decoding of a bar code is still not achieved, the process returns to step 1215, and the process is repeated to try to identify a valid bar code value. In other embodiments, after a specified or predetermined number of iterative loops have occurred without a successful outcome, or after a specified or predetermined time elapses, the process can be aborted by a supervisory control device, which in some embodiments can operate according to a computer program. Although the process depicted in FIG. 4 uses three discrete conditions to drive the lens 920 in the search for a suitable focus condition, it is possible to use more or fewer than three predefined drive conditions as components of such a process. For example, one can define a process in which the focal distance changes by a predefined distance, or a predefined percentage. Alternatively, one can define a process in which the adjustment is based upon a quantity determined from the information obtained in assessing whether the captured image is in focus (as described hereinabove) or from the quality of the decoded information (e.g., whether the information is completely garbled or incorrectly formatted, or is close to being valid). In general, the distances specified may not be attained to absolute precision (for example, a distance of 30 cm may not be measured to a precision of 30.000 cm but merely to 30 cm to within one tenth of a centimeter), but rather the test is that the lens operates adequately at the distance that is identified. In the laboratory, precise distances may be set up for experiments, but in actual use in the field, distances are measured less accurately than in the laboratory.

As discussed hereinbefore, fluid lenses may have aberrations, such as spherical aberration and/or color aberration. In the reader of the invention, additional lenses, such as positive or negative lenses, can be used in conjunction with a fluid lens such as lens 920 to correct one or more of spherical, color, or higher order aberrations. In some embodiments, the materials of construction of the additional lenses can be chosen so as to compensate for optical imperfections and aberrations introduced by the fluid lens.

It is expensive to manufacture devices that require high levels of mechanical precision, with regard to making the components of the device, assembling the components with the required precision, and testing the assemble product to assure compliance with the intended design specifications. There are cost and manufacturability advantages that accrue if one is not required to assemble a device with high precision, and can reduce or omit the testing of the assembled device. Accordingly, using the systems and methods of the invention, the incorporation of a fluid lens 920 in the reader 900 can in some embodiments permit one or more of relaxed design tolerances, relaxed assembly tolerances, and substitution of a calibration step for a testing step. In some instances, devices that would otherwise have been rejected as being outside of design specifications can be appropriately operated by the simple expedient of operating the fluid lens so as to provide an acceptable level of performance. In particular, one way to assure such a condition is to deliberately design a reader in which the baseline operation of the optical system of the reader is set for a condition of operation of the fluid lens at an operating point intermediate in the range of operation of the fluid lens. In such an instance, the fluid lens is first driven at the default (or design) condition, and upon calibration, an "adjusted operating condition" different from the default condition can be identified that causes the specific reader being calibrated to most closely match the design condition. This "adjusted operating condition" is then recorded as the condition that the reader should use as its initial operating state in general operation, and information identifying the "adjusted operating condition" can be save for future reference, for example in a non-volatile memory. By the application of these design principles (e.g., baseline operation at an intermediate point in the range of operation of the fluid lens), and the associated calibration procedure, readers that might have been rejected as failing a quality assurance test if the design criterion were tighter, and/or if the fluid lens was designed to operate at an extremum of its operating range, can be used satisfactorily by adjusting the base operating condition of the fluid lens in a required direction within the range. Examples of readers in which such fluid lens systems can be employed are the IT 4000, the IT 4600, the IT 5600, and the PDT 9500, all available from Hand Held Products, Inc. of Skaneateles Falls, N.Y. Similar functionality could also be implemented in the smaller form factors as one associates with the PDA products. An example of such a product would be the Zire 72 with imager, sold by PalmOne.

FIGS. 5*a* and 5*b* are drawings of hand held readers that embody features of the invention. FIG. 5*a* shows a hand held reader 1500 comprising a case having a substantially linear shape. The handheld reader 1500 comprises circuitry as has been described with regard to FIG. 2, including data processing capability and memory. The hand held reader 1500 comprises an input device 1510, such as a key pad, for use by a user, one or more buttons of which may also be used as a trigger 1534 to allow a user to provide a trigger signal. The hand held reader 1500 comprises an output device 1512, such as a display, for providing information to a user. In some embodiments, the display 1512 comprises a touch screen to allow a user to respond to prompts that are displayed on the display 1512, or to input information or commands using any of icons or graphical symbols, a simulated keypad or keyboard, or through recognition of handwritten information. Hand held reader 1500 can also comprise a touch pad or touch screen that can display information as an output and accept information as an input, for example displaying one or more icons to a user, and accepting activation of one of the icons by the user touching the touch pad or touch screen with a finger or with a stylus 1508. The hand held reader 1500 also comprises a bar code image engine 1514 that includes a fluid lens. The image engine 1514 acquires images of objects of interest that the hand held reader 1500 is employed to read. The fluid lens provides the ability to adjust a focal distance, as is described in more detail herein. The hand held reader 1500 also comprises a card reader 1520 that is configured in various embodiments to read cards bearing information encoded on a magnetic strip, such as is found on credit cards, and information encoded in a semiconductor memory, such as found in PC, PCMCIA or smart cards. The hand held reader 1500 also comprises a wireless communication device 1530 such as a radio transceiver and/or an infrared transceiver for communication with a remote base station, a computer-based data processing system, a second hand held reader 1500', or a device such as a PDA. The hand held reader 1500 also comprises an RFID transceiver 1532 for communicating with an RFID tag. As used herein, the term "RFID tag" is intended to denote a radio-frequency identification tag, whether active or passive, and whether operating according to a standard communication protocol or a proprietary communication protocol. An RFID transceiver can be programmed to operate according to a wide variety of communication protocols. FIG. 5*a* also depicts a card 1540 that in different embodiments includes information encoded on at least one of a magnetic stripe, a semiconductor memory, smart card, and in RFID tag. An example of a hand held reader 1500 in which such fluid lens systems can be employed is the PDT 9500, available from HandHeld Products, Inc. of Skaneateles Falls, N.Y. In one embodiment, the CMOS image array can be implemented with a Micron image sensor such as the Wide VGA MT9V022 image sensor from Micron Technology, Inc., 8000 South Federal Way, Post Office Box 6, Boise, Id. 83707-0006. The MT9V022 image sensor with full frame shutter is described in more detail in the product MT9V099 product flyer available from Micron Technology (www.micron.com), for example at http://download.micron.com/pdf/flyers/mt9v022_(mi-0350)_flyer.pdf. The ICM105T CMOS progressive imager available from IC Media, 5201 Great America Pkwy, Suite 422, Santa Clara, Calif. 95054. The imager is shown at website http://www.ic-media.com/products/view.cfm?product=ICM%2D105T. This imager uses a rolling shutter. Although both imagers cited are progressive imagers, as is well known in the art, interleaved imagers will also function properly in these systems.

FIG. 5*b* shows another embodiment of a hand held reader 1550 which comprises components as enumerated with respect to hand held reader 1500, including specifically input 1510, output 1512, image engine and fluid lens 1514, card reader 1520, radio 1530, and RFID transceiver 1532. The handheld reader 1550 comprises circuitry as has been described with regard to FIG. 2, including data processing capability and memory. For hand held reader 1550, the case 1560 comprises a "pistol grip" or a portion disposed at an angle, generally approaching 90 degrees, to an optical axis of the imaging engine and fluid lens of the reader 1550. Hand held reader 1550 also comprises a trigger 1534, for example situated on the pistol grip portion of the reader 1550, and located so as to be conveniently operated by a finger of a user. Hand held reader 1550 also comprises a cable or cord 1570 for connection by wire to a base station, a computer-based data processing system, or a point of sale apparatus. Examples of readers 1550 in which such fluid lens systems can be employed are the IT 4600 comprising a 2D image sensor array, and the IT 5600 comprising a 1D image sensor array, all available from Hand Held Products, Inc. of Skaneateles Falls, N.Y.

In some embodiments, the hand held readers 1500 and 1550 are deployed at a fixed location, for example by being removably secured in a mount having an orientation that is controlled, which may be a stationary mount or a mount that can be reoriented. Examples of such uses are in a commercial setting, for example at a point of sale, at the entrance or exit to a building such as an office building or a warehouse, or in a government building such as a school or a courthouse. The hand held readers of the invention can be used to identify any object that bears an identifier comprising one or more of a bar code, a magnetic stripe, an RFID tag, and a semiconductor memory.

In some embodiments, the hand held reader 1500, 1550 can be configured to operate in either a "decode mode" or a "picture taking" mode. The hand held reader 1500, 1550 can be configured so that the decode mode and picture taking mode are user-selectable. For example, the reader can be configured to include a graphical user interface (GUI) for example on a touch pad or key pad that is both an input and an output device as depicted in FIG. 5*a* or a trigger as depicted in FIG. 5*b* enabling a user to select between the decode mode and the picture taking mode. In one embodiment, the decode mode is selected by clicking on an icon displayed on a display such as display 1512 of FIG. 5*a* whereby the reader is configured with a decode mode as a default. Alternatively, the mode of operation (either "decode mode" or "picture taking mode") can be set by a communication from a remote device, or by default upon initial activation of the reader, as part of a power-up sequence. Thus, the reader is configured to operate in the decode mode on the next (and subsequent) activation of trigger 1534 to generate a trigger signal. In the decode mode, the hand held reader 1500, 1550 in response to the generation of the trigger signal captures an image, decodes the image utilizing one or more bar code decoding algorithms and outputs a decoded out message. The decoded out message may be output, e.g., to one or more of a memory, a display 1512 or to a remote device, for example by radio communication or by a hardwired communication.

In one embodiment, the "picture taking mode" is selected is selected by clicking on icon (which can be a toggle switch), and hand held reader 1500, 1550 is configured in a "picture taking mode" as the default mode. Thus, the hand held reader 1500, 1550 is configured to operate in the "picture taking mode" on the next (and subsequent) activation of trigger 1534 to generate a trigger signal. The hand held reader 1500, 1550 in response to the generation of the trigger signal captures an image and outputs an image to one or more of a memory, to a display 1512, or to a remote device.

The hand held reader 1500, 1550 can be configured so that when the image capture mode is selected, the hand held reader 1500, 1550 avoids attempting to decode captured images. It is understood that in the process of capturing an image for decoding responsively to receipt of a trigger signal, the hand held reader 1500, 1550 may capture a plurality "test" frames, these may be full frames or only partial frames as discussed above, for use in establishing imaging parameters (e.g., exposure, gain, focus, zoom) and may discard frames determined after decode attempts to not contain decodable symbol representations. Likewise in the process of capturing an image for image output responsively to receipt of a trigger signal in a picture taking mode, the hand held reader 1500, 1550 may capture test frames, these may be full frames or only partial frames as discussed above, for use in establishing imaging parameters and may also discard images that are determined to be unsuitable for output. It is also understood that in the "picture taking mode" the images captured may be archived for later analysis, including decoding of bar codes or other encoded indicia that may be present in the images, for example for use in providing evidence of the condition of a package at the time of shipment from a vendor for insurance purposes (which image may never be decoded if the package arrives safely). Other examples of similar kind can be a photograph of a loaded truck, for example with a license plate, an identifying number or similar indication of which of many possible trucks is the subject of the photograph, optionally including a date and time, and possibly other information that can be stored with the image, such as the identity of the photographer (e.g., a name, an employee number, or other personal identifier).

In an alternative embodiment, the hand held reader 1500, 1550 displays a plurality of icons (at least one for decode mode and one for picture taking mode) whereby activation of an icon both configures the hand held reader 1500, 1550 to operate in the selected operating mode (decoding or picture taking) and results in a trigger signal automatically being generated to commence an image capture/decode (decode mode) or image capture/output image process (picture taking mode). Thus, in the alternative embodiment, the trigger 1534 need not be actuated to commence image capture after an icon is actuated.

Figure 6:
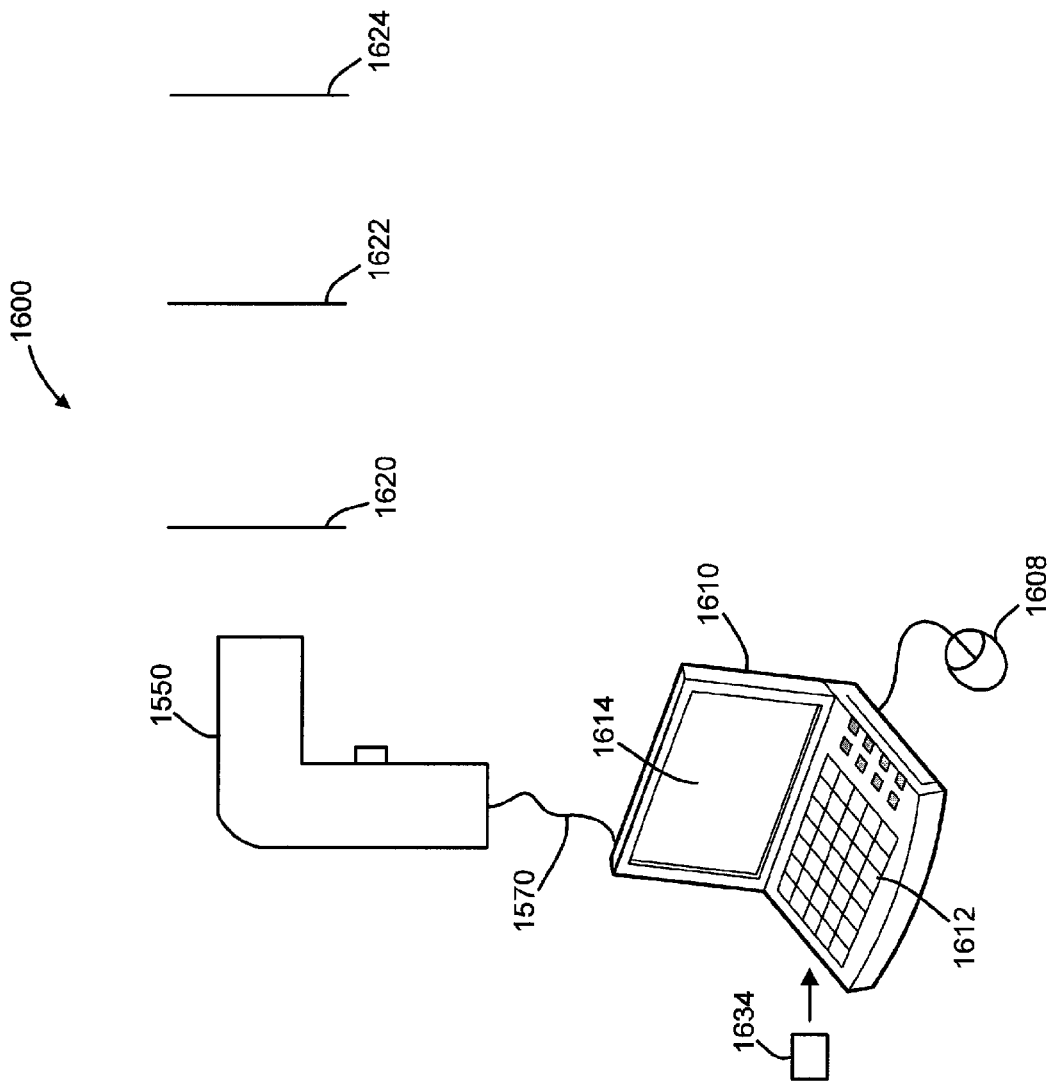
FIG. 6 is a diagram of a handheld reader of the invention in communication with a computer.

FIG. 6 is a diagram 1600 of a handheld reader of the invention in communication with a computer. In FIG. 6, a hand held reader 1550 of the type described hereinabove is connected by way of a cable 1570 to a computer 1610, which in the embodiment depicted is a laptop or portable computer. The computer 1610 comprises the customary computer components, including an input 1612, which may include a keyboard, a keypad and a pointing device such as a mouse 1608, an output 1614 for use by a user, such as a display screen, and software 1630 recorded on one or more machine-readable media. Examples of software that operate on the computer 1610 are a QuickView program 1632 (available from Hand Held Products of Skaneateles Falls, N.Y.) that provides a display of the image as "seen" by the image engine and fluids lens in the hand held reader 1550 on the display 1614 of the computer 1610, and a interactive program 1634, for example provided on a machine readable medium, (not shown) that allows a user to control the signal applied to the fluid lens and to observe that response of the fluid lens thereto, for example as a representation in a graph or as a representation of one or more images read by the reader as the fluid lens control signal is varied. As used herein, "signal" refers to an input, controlled by a user, the signal operating in turn on a control system or element such as a solenoid, voice coil, electrostatic motor or MEMs pump, artificial muscle or polymer [CHECK THIS PARA AT THE END!]. In FIG. 6, there are also shown a plurality of test targets 1620, 1622, 1624, which in some embodiments are optical test targets conforming to a test target known as the United States Air Force ("USAF") 1951 Target (or 1951 USAF Resolution Target) as shown and described at the web site http://www.sinepatterns.com/ USAF_labels.htm, and provided commercially in a variety of forms by SINE PATTERNS LLC, 1653 East Main Street, Rochester, N.Y. 14609, a manufacturer of the 1951 USAF Target and many other types of targets and visual patterns, as further indicated at the web site http://www.sinepatterns.com/i_Stdrds.htm.

The example depicted in FIG. 6 shows a target at each of three distances or positions relative to the hand held reader 1550. In one embodiment, the three targets lie along a single optical axis at discrete, different distances. Each target 1620, 1622, 1624 presents an object, such as a known test pattern of defined geometry, that the hand held reader 1550 can image. By controlling the behavior of the fluid lens in the hand held reader 1550, it is possible to calibrate the operation of the fluid lens by recording the observed control signal (such as a voltage or impressed electric potential) that is required to obtain an acceptable (e.g., an image within an acceptable range of image quality or one that can be correctly decoded to retrieve information encoded therein), and preferably optimal, image of the target at each location or position.

Figure 7:
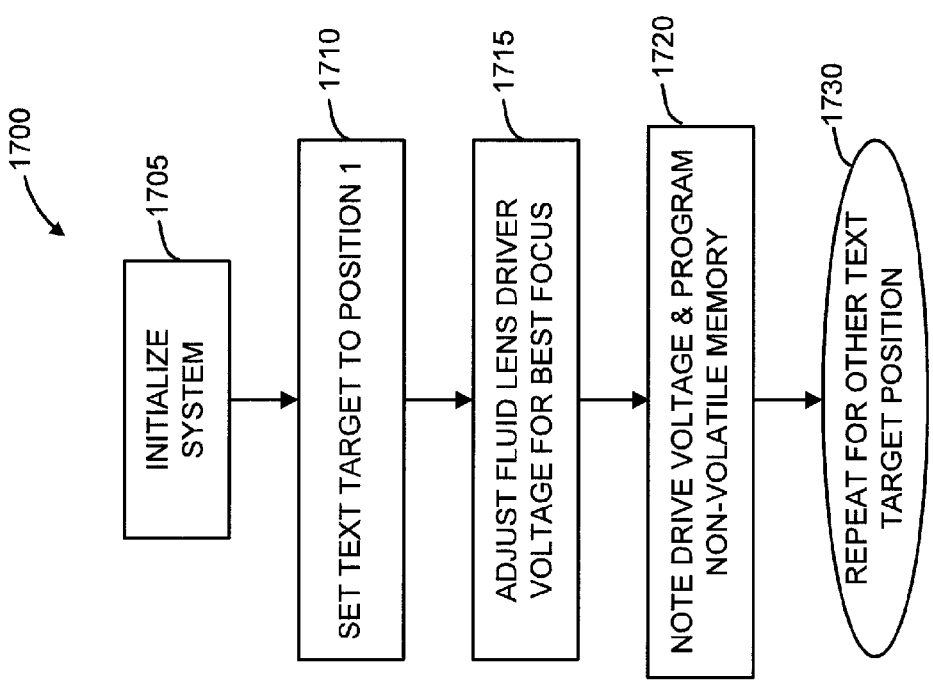
FIG. 7 is a flow chart of a calibration process useful for calibrating apparatus embodying features of the invention.

FIG. 7 is a flow chart 1700 of a calibration process useful for calibrating an apparatus embodying features of the invention. In FIG. 7, the calibration is initiated, as shown at step 1705, by initializing the system, including performing all power-on-sequence tests to assure that the system components are operating properly. At step 1710, a test target bearing a pattern or encoded symbol is positioned at a first test position. When in the first test position, the target will in general be a defined distance and orientation relative to the hand held reader comprising a fluid lens. At step 1715, the fluid lens control signal (which in some embodiments is a voltage) is adjusted to obtain an acceptable, and preferably an optimal, focus condition for the target. At step 1720, the distance and orientation of the target and the fluid lens control signal parameters are recorded for future use in a non-volatile memory, for example in a table.

One can iteratively repeat the process steps of locating the target at a new location and orientation, controlling the fluid lens control signal applied to the fluid lens to obtain a satisfactory, and preferably optimal, focus, and recording in a memory the information about the target location and the fluid lens control signal parameters, so as to provide a more complete and detailed set of calibration parameters. The number of iterations is limited only by the amount of time and effort one wishes to expend performing calibration steps, and the amount of memory available for recording the calibration parameters observed. In the example presented in FIG. 6, a calibration according to the flow diagram of FIG. 7 would include performing calibration steps as described by steps 1710, 1715 and 1720 at three distinct positions for the target. The information obtained in calibration tests can be used when operating the corresponding imager (or in some instances, another imager of similar type) either by using the calibration information as an initial setting for operation in a closed loop mode as explained in connection with FIG. 3, or as fixed operating conditions for discrete points in an open loop operating mode as explained in connection with FIG. 4.

Figure 8:
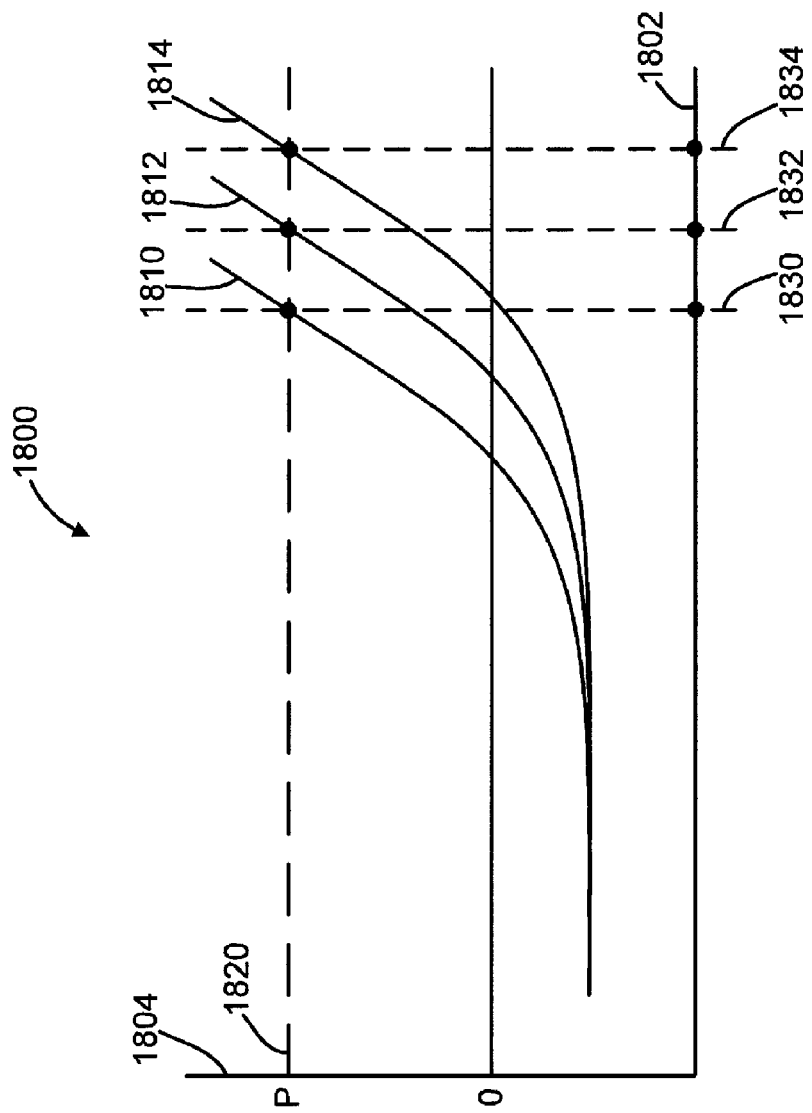
FIG. 8 is a diagram showing calibration curves for a plurality of exemplary hand held readers embodying features of the invention.

FIG. 8 is a diagram 1800 showing calibration curves for a plurality of exemplary hand held readers. In FIG. 8, the horizontal axis 1802 represents a fluid lens control signal parameter, such as voltage, and the vertical axis 1804 represents an optical property of the fluid lens, such as optical power. One can also represent other optical properties of a fluid lens that are relevant for its operation, such as focal length and f-number. In FIG. 8, three curves 1810, 1812, 1814 are shown, each curve representing a response (e.g., optical power) of a specific fluid lens to an applied fluid lens control signal (e.g., voltage). As seen in FIG. 8, the curve 1810, representing the behavior of a first fluid lens, reaches an optical power P 1820 at an applied voltage $V_1$ 1830. However, other fluid lenses may behave slightly differently, such that a second fluid lens, represented by curve 1812, attains optical power P at an somewhat larger voltage $V_2$ 1832, and a third fluid lens, represented by curve 1814, attains optical power P at yet a larger voltage $V_3$ 1834. Accordingly, one can extract from the information in FIG. 8 a relation between the fluid lens control signal that is to be applied to the first fluid lens and the second fluid lens to attain the same optical power P, for example for operating two hand held readers under substantially similar conditions, or for operating a binocular reader or other device that uses two fluid lenses simultaneously, for example to generate a stereoscopic view of a target. At power P, there exists a difference in drive voltage between the first lens and the second lens given by $V_2-V_1$, where the difference has a magnitude given by the absolute value of $V_2-V_1$ and a sign which is positive if $V_2$ exceeds $V_1$ in magnitude, negative if $V_1$ exceeds $V_2$ in magnitude, and zero if $V_2-V_1$. In operation, in order to attain optical power P in both of the first and second fluid lenses, one can provide a fluid lens control signal equal to $V_1$ to both the first and second fluid lenses, and a differential signal equal to the signed difference of $V_2-V_1$ to the second fluid lens. Alternatively, one could use two power supplies that provide signals $V_1$ and $V_2$ to the first and second fluid lenses, respectively. As the optical power required for operation of a fluid lens changes, the fluid lens control signal changes, and can be deduced or read from the appropriate curve of FIG. 8. Since one in general does not measure the parameters of a fluid lens or other device at all possible values within a range, a curve such as 1810 can also be obtained by measuring a discrete number of pairs of optical parameter and associated fluid lens control signal, and fitting a curve to the data, or interpolating values between adjacent data points, as may be most convenient to prepare a suitable calibration curve. In some instances, only a single calibration point per fluid lens module may be required. Rather than creating curves for different fluid lenses, one can measure the same fluid lens at different temperatures. Then the appropriate operating point can be determined at the various temperatures. Other operating points may be determined by either extrapolation or interpolation, by suitable curve fitting relationships, or by deducing a representation of the behavior in the form of an equation.

Figures 9A, 9B, 9C, 9D, 9E:
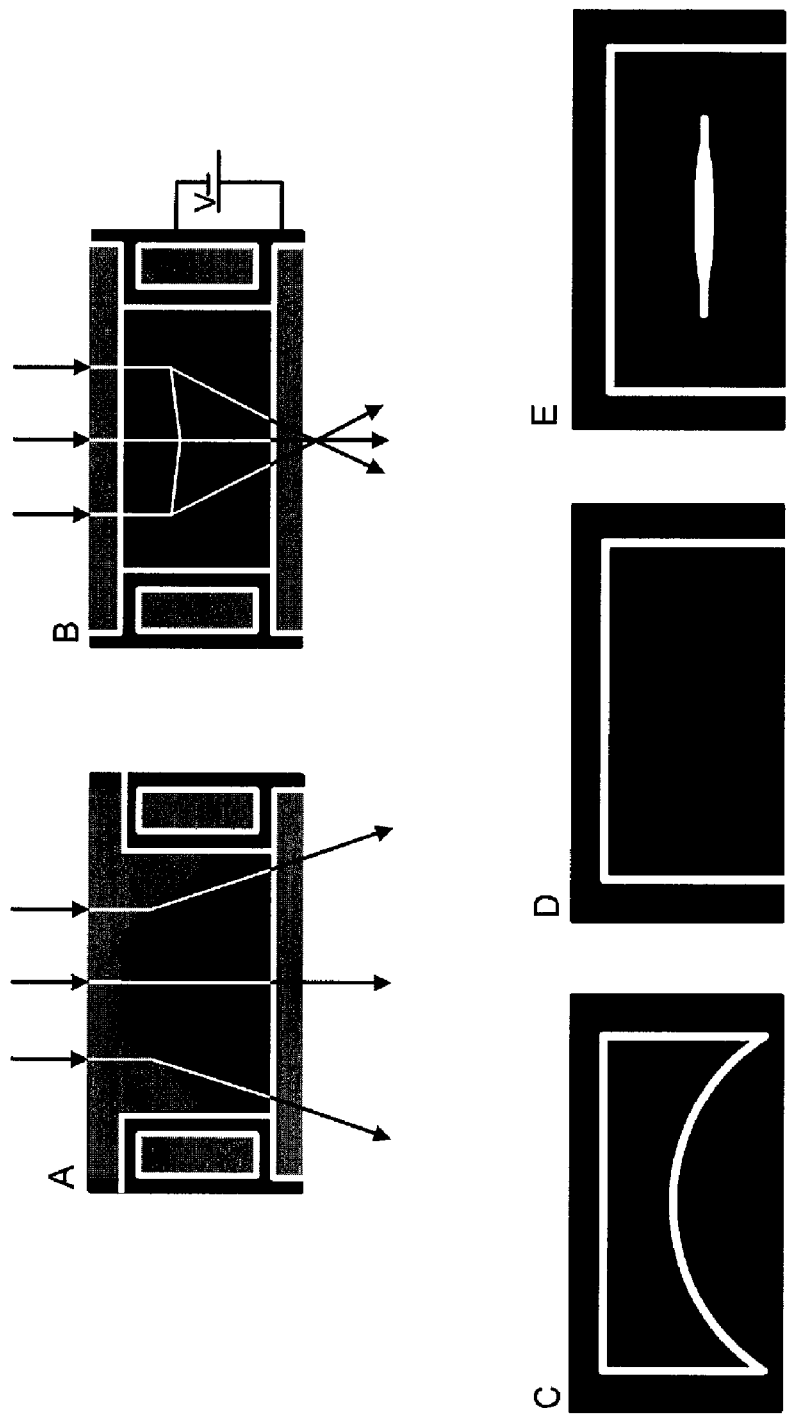
FIGS. 9a-9e are cross-sectional diagrams of another prior art fluid lens that can be adapted for use according to the principles of the invention.

FIGS. 9a-9e are cross-sectional diagrams of another prior art fluid lens that can be adapted for use according to the principles of the invention. FIG. 9a is a cross-sectional view of a prior art fluid lens having no control signal applied thereto and exhibiting divergence of transmitted light. FIG. 9b is a cross-sectional view of a prior art fluid lens having a control signal applied thereto and exhibiting convergence of transmitted light. FIGS. 9c, 9b, and 9e are cross-sectional images of fluid lenses having convex, flat and concave interface surfaces as viewed from a position above each lens, respectively.

Using a device comprising a fluid lens, an image sensor, and a suitable memory, it is possible to record a plurality of frames that are observed using the fluid lens under one or more operating conditions. The device can further comprise a computation engine, such as a CPU and an associated memory adapted to record instructions and data, for example for processing data in one or more frames. The device can additionally comprise one or more control circuits or control units, for example for controlling the operation of the fluid lens, for operating the image sensor, and for controlling sources of illumination. In some embodiments, there is a DMA channel for communicating data among the image sensor, the CPU, and one or more memories. The data to be communicated can be in raw or processed form. In some embodiments, the device further one or more comprises communication ports adapted to one or more of hard-wired communication, wireless communication, communication using visible or infra-red radiation, and communication employing networks, such as the commercial telephone system, the Internet, a LAN, or a WAN.

In this embodiment, by applying suitable selection criteria, one can use or display only a good frame or alternatively a most suitable frame of the plurality for further data manipulation, image processing, or for display. According to this aspect of the invention, the device can obtain a plurality of frames of data, a frame being an amount of data contained within the signals that can be extracted from the imager in a single exposure cycle. The device can assess the quality of each of the frames against a selection criterion, which can be a relative criterion or an absolute criterion. Examples of selection criteria are an average exposure level, an extremum exposure level, a contrast level, a color or chroma level, a sharpness, a decodability of a symbol within a frame, and a level of compliance of an image or a portion thereof with a standard. Based on the selection criterion, the device can be programmed to select a best or a closest to optimal frame from the plurality of frames, and to make that frame available for display, for image processing, and/or for data manipulation. In addition, the operating conditions for the device can be monitored by the control circuit, so that the conditions under which the optimal frame was observed can be used again for additional frame or image acquisition.

In alternative embodiments, it is possible to use the plurality of frames as a range finding system by identifying which frame is closest to being in focus, and observing the corresponding focal length of the fluid lens. In such an embodiment, the fluid lens can be operated so as to change its plane of optimum focus from infinity to an appropriate near position. The device can obtain one or more frames of data for each focus position that is selected, with the information relating to each focus position being recorded, or being computable from a defined algorithm or relationship, so that the focal length used for each image can be determined. Upon a determination of an object of interest within a frame (or of an entire frame) that is deemed to be in best focus from the plurality of frames, the distance from the device to the object of interest in the frame can be determined from the information about the focal length setting of the fluid lens corresponding to that frame. In some instances, if two adjacent frames are deemed to be in suitable focus, the distance may be taken as the average of the two focal lengths corresponding to the two frames, or alternatively, additional frames can be observed using focal lengths selected to lie between the two adjacent frames, so as to improve the accuracy of the measurement of distance.

In a second embodiment, apparatus and methods are provided to counteract changes in the environment that surrounds an apparatus comprising a fluid lens. In one embodiment, the apparatus additionally comprises a temperature sensor with a feed back (or feed forward) control circuit, to provide correction to the fluid lens operating signal as the temperature of the fluid lens (or of its environment) is observed to change.

Feedback systems rely on the principle of providing a reference signal (such as a set point) or a plurality of signals (such as a minimum value and a maximum value for a temperature range) that define a suitable or a desired operating parameter (such as a temperature or a pressure), and comparing a measured value of the parameter to the desired value. When a deviation between the observed (or actual) parameter value and the desired parameter value is measured, corrective action is taken to bring the observed or actual value into agreement with the desired parameter value. In the example of temperature, a heater (such as a resistance heater) or a cooling device (such as a cooling coil carrying a coolant such as water) can be operated to adjust an actual temperature. Using a feedback loop, the apparatus is made to operate at the desired set point, or within the desired range. Feedback loops can be provided using either or both of digital and analog signal processing, and using one or more of derivative, integral and proportional ("D-I-P") controllers.

In some embodiments, a feed-forward system can be used, in which a change (or a rate of change) of a parameter such as actual or observed temperature is measured. Corrective action is taken when it is perceived that a condition outside of acceptable operating conditions likely would be attained if no corrective action were to be applied and the observed change (or rate of change) of the parameter were allowed to continue unabated for a further amount of time. Feed-forward systems can be implemented using either or both of digital and analog signal processing. In some systems, combinations of feedback and feed-forward systems can be applied. In some embodiments, multiple feedback and feed-forward controls can be implemented.

In the embodiment contemplated, the operating parameter, such as temperature, of the apparatus comprising a fluid lens, or of the environment in which it is situated, is monitored, and the observed parameter is compared to one or more predefined values. The one or more predefined values may fixed (such as a maximum tolerable temperature above which a substance begins to degrade at one atmosphere of pressure) or the one or more predefined values may depend on more than one parameter, such as the combination of pressure and temperature, for example using relationships in a pressure-temperature-composition phase diagram (for example, that a substance or chemical composition in the fluid lens apparatus undergoes a phase change if the pressure and temperature vary such that a phase boundary is crossed, or undergoes a change from covalent to ionic character, or the reverse).

In another embodiment, a system comprising a fluid lens additionally comprises a non-adjustable lens component configured to correct one or more specific limitations or imperfections of the fluid lens, such as correcting for color, spherical, coma, or other aberrations of the fluid lens itself or of the fluid lens in conjunction with one or more other optical components. By way of example, a fluid lens may exhibit dispersive behavior or color error. In one embodiment, a second optical element is added that provides dispersion of the sign opposite to that exhibited by the fluid lens, so as to correct the dispersive error introduced by the fluid lens. In one embodiment, the dispersive element is a diffraction element, such as an embossed grating or an embossed diffractive element. As will be understood, different optical materials have different dispersive characteristics, for example, two glass compositions can have different dispersion, or a composition of glass and a plastic material can have different dispersion. In the present invention, a material having a suitable dispersive characteristic, or one made to have suitable dispersive characteristics by controlling the geometry of the material, such as in a grating or other diffractive element, can be used to correct the errors attributable to the fluid lens and/or the other components in an optical train.

The aberrations that are possible in a fluid lens can in principle be of any order, much as the aberrations that are possible in the lens or the cornea of a human eye. Both a human eye and a fluid lens operate using interfaces between two or more dissimilar fluids. In the human eye, there are membranes that are used to apply forces to the fluids adjacent the membranes, by application of muscle power controlled by signals cried by the nervous system. In a fluid lens, there are forces that are applied, in some instances to the fluid or fluids directly by electromagnetic signals, and in some instances by forces applied to transparent membranes that are adjacent the fluids. Both kinds of systems can be affected by external forces, such as the force of gravity and other accelerative forces, changes in ambient or applied pressure, and changes in ambient or applied temperature.

In another embodiment, there is provided a calibration tool, process, or method for calibrating a fluid lens. As one example, a system comprising a fluid lens is operated at one or more known conditions, such as one or more magnifications or one or more focal lengths. For each known operating condition, an operating parameter, such as a value of the driving voltage, is observed or measured. The observed or measured data is stored in a memory. The data in memory is then used to provide calibration data for application to the operation of the fluid lens.

Even if two or more nominally identical fluid lenses are provided, there can be differences that exist in the two fluid lenses themselves, as has been explained hereinbefore. When intrinsic differences between two nominally identical fluid lenses exist, application of a substantially identical fluid lens control signal to the two lenses can result in different operative behavior for each lens. A default calibration can be provided, for example based on a calibration performed under controlled or defined conditions. The default calibration data can be recorded and used at a later time to operate the fluid lens for which the calibration was obtained. Using such calibrations is an effective and efficient way to operate a given fluid lens over a defined operating range. For many purposes, such information is well worth having and helps to provide a fluid lens that is conveniently operated in a predictable manner. Between calibration points, interpolation can be used to achieve an improved resolution. Similarly extrapolation may be used to estimate the attributes of a feature beyond the range of measured calibration data.

In addition, as has been indicated, differences may be externally imposed, such as applied voltage, ambient or applied pressure, ambient or applied temperature, and accelerative forces. These forces may, individually and in combination, cause one fluid lens to operate somewhat differently that a nominally identical fluid lens. When such differences in operating conditions exist, application of a substantially identical fluid lens control signal to the two lenses can result in different operative behavior for each lens. Accordingly, it can be helpful to provide a simple and readily applied calibration method for a fluid lens, so that each lens can be calibrated and provided with suitable fluid lens control signals to operate in a desired fashion under the particular conditions obtaining for that fluid lens.

Yet a third reason for providing calibration capabilities relates to changes in operation of a given fluid lens over time. The operation of an individual fluid lens relies on one or more of the chemical, mechanical, and electrical properties of the components of the fluid lens, which properties may change with time and with use. For example, as indicated hereinabove, a fluid lens operating in response to electrical signals may undergo electrochemically driven reactions in one or more fluids. In addition, a fluid may change properties over time as a result thermal history, such as of repeated heating and cooling cycles or exposure to extremes of temperature. As will be understood, as a property of one or more components of a fluid lens changes with time, it may be advantageous to calibrate the operating conditions of interest.

In another embodiment, an inertial device such as an accelerometer is provided to determine an orientation of a fluid lens, which orientation information is used to self-calibrate the fluid lens. Gravitational and other accelerative forces can cause fluids to move and change shape at a free boundary, or a boundary where two fluids come into mutual contact. By way of example, consider a fluid lens that comprises two fluids having slightly different densities. Different density implies that equal volumes of the two fluids will have proportionately different masses, because density=mass/volume. Therefore, since Force (F)=mass×acceleration, the equal volumes of the two fluids will experience slightly different forces under equal acceleration, such as the acceleration of gravity, or of an external accelerative force applied to a container holding the two fluids. One consequence of such an applied acceleration can be a change in the relative locations of the fluids, and as a result, a change in the shape of the interface defined by the surface of contact between the two fluids. In addition, the direction of application of the acceleration will also have a bearing on the response of the fluids. For example, an acceleration applied normal to a flat interface between the two fluids may have much less of an effect than an acceleration parallel to, or tangent to, a surface component of the interface between the two fluids. Since the accelerative force in general can be applied at any angle with regard to an interface between the two fluids, there will in general be differences in response depending on the precise orientation of the applied accelerative force. Inertial sensors such as accelerometers and gyroscopes can be useful in determining and in tracking the position of an object over time. Through the use of such inertial sensors, it is possible to discern an orientation of an object, and to measure the magnitudes and directions of applied accelerative forces. It is possible to calculate or to model how the fluids present in the lens will respond to the forces operating on the lens with knowledge of the orientation of a fluid lens and of the external forces, including that of gravity. While the description presented hereinabove may be understood to describe linear accelerative forces such as gravity, it is also possible to perform both the tracking and the calculation of the responses of fluids to forces having non-linear components, forces having rotational components, or time-varying forces. In some embodiments, using appropriate sensors for various forces, one can determine the relative orientation of the applied force and the interface between two fluids, and compute what response would be expected. As a result of the computation, information is provided for the timely application of a restorativesignal. In one embodiment, solid state accelerometer sensors are provided that operate at sufficiently high rates as to determine the magnitude and orientation of an external force. Accelerometers having response rates of at least 10,000 Hz are available from Crossbow Technology, Inc. located at 4145 N. First Street, San Jose, Calif. 95134.

In another embodiment, in an apparatus comprising a fluid lens, the fluid lens is operated to provide corrective properties with regard to such distortions as may be caused by vibration, location or orientation of the lens, chromatic aberration, distortions caused by higher order optical imperfections, and aberrations induced by environmental factors, such as changes in pressure. As has been explained hereinbefore, using accelerative forces as an example, the fluid lens may in some instances be subjected to various distorting forces or to forces that cause degradation of the operation of the fluid lens from that which is desired. In other instances, the fluid lens may have inherent imperfections, such as chromatic aberration or higher order optical imperfections. It is possible to analyze such optical imperfections in various ways, such as the use of a calibrated imaging system comprising a source, at least one image sensor, and hardware and/or software configured to analyze optical information to assess whether errors or imperfections exist in an optical component under test. The calibrated imaging system in some instances can be a laboratory setting in which highly sophisticated equipment is employed to perform tests. In other instances, the calibrated test system can comprise a source that provides a known optical signal that is passed through an optical component under test, and the analysis of the resulting signal that emerges from the optical component under test. The calibrated test system in some embodiments is a system or device suitable for use in the field, so that periodic calibration can be performed in a convenient and efficient manner, if necessary by personnel who are not familiar with all of the sophistications of optical testing in a laboratory setting.

In one embodiment, the optical component can be modeled in the frequency domain as a transfer function, wherein a known applied input signal $I(s)$ is provided and an observed output signal $O(s)$ is measured. An observed transfer function $H_{obs}(s)=O(s)/I(s)$ is determined. $H_{obs}(s)$ can then be compared to a desired transfer function $H(s)$, to determine a corrective factor or relation $C(s)$ that should be applied to the system under test to cause it to perform as desired, where $C(s)H_{obs}(s)=H(s)$, or $C(s)=H(s)/H_{obs}(s)$. Once the corrective factor or relation $C(s)$ has been determined, it (or its time domain equivalent) can be applied to drive the fluid lens so as to reduce the observed imperfection or imperfections. Transfer function concepts, discrete time mathematical procedures, digital filters and filtering methods, and circuitry (including hardware and software) that can handle the required detection, analysis and computation, and can be used to apply corrective action are described in many texts on real time digital signal processing. Hardware such as digital signal processors are commercially available from multiple vendors.

FIGS. 10A and 10B are diagrams that show an LED die 3010 emitting energy in a forward direction through a fluid lens 3020. The divergence of the emitted light is modified with the fluid lens. In FIG. 10A the divergence of the emitted light is modified because of the optical power of the fluid lens. In the example shown the light exiting the fluid lens could be considered to approximate collimated light even though the light exiting the LED is diverging. In a situation where the curvature of the fluid lens is more extreme than is shown in FIG. 10A, the light may be focused on a small region, or even down to a point of light. In FIG. 10B the power of the fluid lens has been reduced to approximately zero so that the divergence of the light emitted by the LED is substantially unchanged. The comparison of the light patterns in FIGS. 10A and 10B indicates that such systems can be used to control the coverage (in area) and intensity of illumination at a target of interest, for example a bar code that one is interested in reading with a hand held reader or imager. In some embodiments, one or more windows on a reader or scanner may also be used to protect the optical system including the fluid lens from adverse environmental conditions.

It should be appreciated that although the details may change, this concept also applies to encapsulated LEDs, as well as to fluid lens assemblies that may contain additional optical elements such as spherical, aspherical and cylindrical lens elements.

In one embodiment, such a system is expected to more efficiently utilize a higher fraction of light emitted by the LEDs. For example when viewing bar code patterns near the imager, a more diverging illumination pattern is desirable in order to be assured that larger bar code patterns are illuminated over their entire extent and when viewing bar code patterns at a larger distance from the imager, a more converging illumination pattern is desirable so that illumination is not wasted by falling outside the optical field of interest.

Figure 11A:
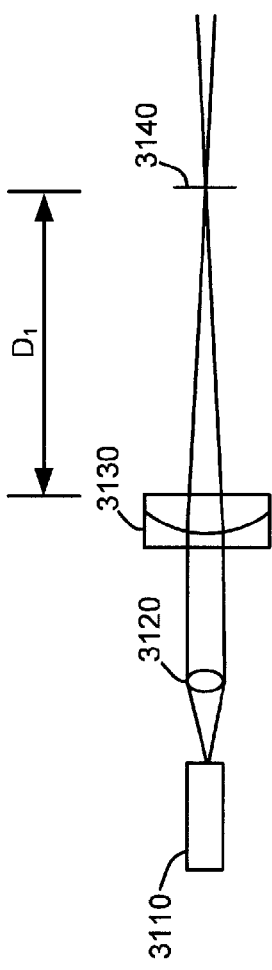
FIGS. 11A and 11B show diagrams of a laser scanner comprising a laser 3110, a collimating lens 3120, and a fluid lens 3130 in various configurations, according to principles of the invention.
Figure 11B:
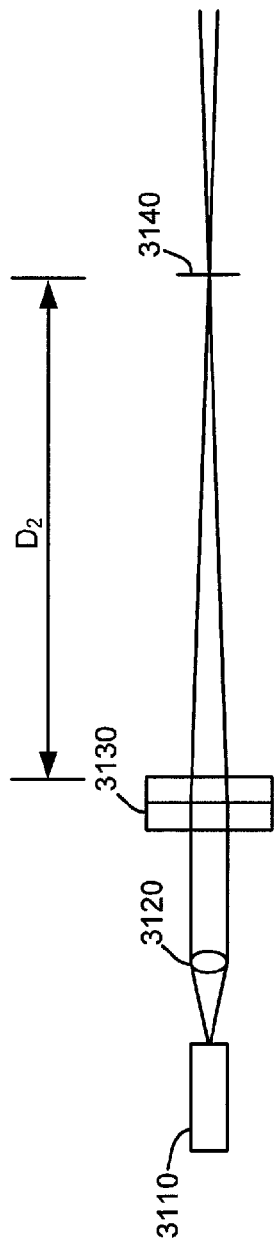
Figure 11C:
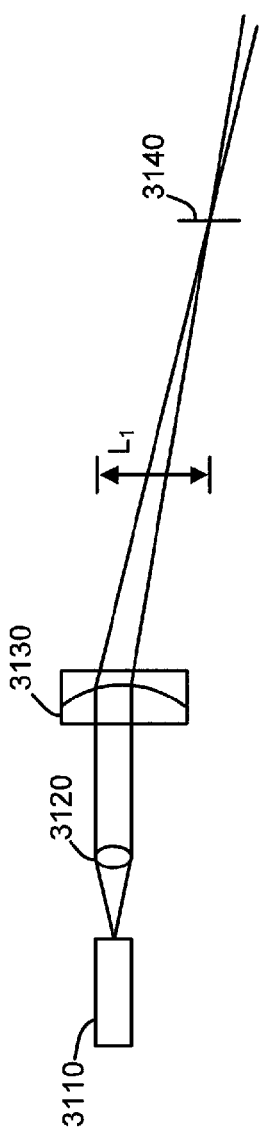

FIGS. 11A and 11B show diagrams of a laser scanner comprising a laser 3110, a collimating lens 3120, and a fluid lens 3130 in various configurations. In FIG. 11A the fluid lens is configured to have a first optical power and a first focal length. The light beam emanating from the fluid lens 3130 is focused to have a narrowest beam width at a plane 3140 situated at a first distance D1 from the fluid lens 3130. In FIG. 11B the fluid lens is configured to have a second optical power and a second focal length. In FIG. 11B, the light beam emanating from the fluid lens 3130 is focused to have a narrowest beam width at a plane 3140 situated at a first distance D2 from the fluid lens 3130, such that D2 is greater than D1

Fluid zoom lens configurations can be used in bar code scanners to enable imaging of different bar codes at various distances from the bar code scanner. In bar code scanners manufactured today, often a large working distance is achieved by stopping down the lens aperture to increase the optical depth of field. However this has two disadvantages: First, when the lens stop is smaller, the optical system point spread function increases thereby making it more difficult to scan bar code patterns with narrow bar code elements. Second, when the lens stop is smaller, less light enters the lens thereby reducing the signal-to-noise ratio of the system. The lower SNR requires the operator to hold the reader still for longer period of time. The effect is that the bar code scanner has an increased sensitivity to hand motion. In addition, because longer periods of time are required, the user is more likely to become fatigued.

These disadvantages can be significantly reduced using a zoom lens to change both the optical power of the lens system and also the plane of optimum focus. This additional control of the operating parameters of the reader or imager would allow the use of a lens system with a larger numerical aperture. In the examples given by Welch Allyn workers, the bar code scanner imager (CCD, CMOS, or color imager) would take the place of the physician's eye (or imager in some systems) and the bar code would replace the patient's eye.

Object distance measurements can be made if the range of, or the distance to, the object is known. A fluid lens system can be used to implement a range finding system. In one embodiment, the fluid lens would be focused at a number of focus positions and the position with the best focus, as determined by any of a number of metrics, would be associated with that fluid lens position. By knowing the fluid lens drive signal that caused the fluid lens to have an optimally focused image, and using a table look-up, the associated distance from the system for that specific fluid lens operating signal can be determined. By knowing the range, the magnification can be calculated and thus the object width associated with a given number of pixels at the imager is known or can be deduced. In this way a system such as a bar code reader or imager can calculate the width of a specific object features, such as bar code element widths or the dimensions of a package.

A fluid lens variable aperture can be added to a bar code system. In some embodiments, the aperture would be used in the portion of the optical system that receives light and would allow the system to optimally trade light efficiency against point spread function width and depth of field. When a small aperture is used, the optical system will have a larger depth of field, but adversely the optical throughput of the system is reduced (i.e., less light gets through the system) and the point spread function (proportional to the minimal element size that can be resolved) is also reduced. In some embodiments, a bar code system is expected to be configured to initially have the optical system set for an optimum light throughput, and if a good read is not achieved then the aperture size could be reduced in order to extend the depth of field in an effort to decode any bar code pattern that may be within the bar code scanner field of view.

By having more than one lens element configured as a fluid lens, the optical aberrations present in a single element can be reduced for the assemblage of lenses and this would result in a higher quality optical image. The techniques for optimizing a triplet are well known in the lens design art. However, it is typically the case that any given lens is optimized for a given focal length system. Typically, if a lens is optimized for one combination of optical elements, it is not optimally configured when one of the lens surfaces is changed as would happen when a single fluid element is operated to change an optical parameter, such as a focal length. By adding a second fluid lens, the combination of the first lens and the second lens can be optimized to minimize total system aberrations. For different settings of the first lens, corresponding changes in the settings of the second lens can be made to obtain an optimal combination. These optimized relationships between the two fluid lens surfaces curvatures, i.e. surface optical power, and thus also the control voltages, can be contained for example in a table that is recorded in a machine readable memory. Thus for any given setting of desired system optical power, the appropriate drive signals for the two fluid lenses can be developed, and applied in accordance with the recorded values. Where desirable or advantageous, the fineness of the table resolution may be increased through use of linear or higher order interpolation and extrapolation.

Other prior art fluid lens systems that operate using mechanical forces to control the shape and properties of a fluid lens are described in U.S. Pat. No. 4,514,048 to Rogers, which has already been incorporated herein by reference in its entirety. Additional disclosure relevant to variable focus lenses is presented in the following U.S. Patents: U.S. Pat. No. 2,300,251 issued Oct. 17, 1942 to Flint, U.S. Pat. No. 3,161,718 issued Dec. 15, 1964 to DeLuca, U.S. Pat. No. 3,305,294 issued Feb. 21, 1967 to Alvarez, and U.S. Pat. No. 3,583,790 issued Jun. 8, 1971 to Baker, all of which are hereby incorporated by reference herein in their entirety.

An approach to controlling the shape of the lens is the use of an electronic fluid lens pump or micropump. This approach may additionally be implemented in such a manner as to close or seal the otherwise exposed face of the fluid lens, thereby preventing fluid loss, as from evaporation or wicking, as well as contamination. This is important because in some fluid lenses, surface tension is used to maintain a given lens curvature, and any contact with the lens surface may cause contamination and/or wicking of the lens material to the contacting material. In addition, the exposed lens surface may lose mass, and hence volume, to evaporation, resulting in unwanted or unintentional changes in lens curvature.

Figure 12:
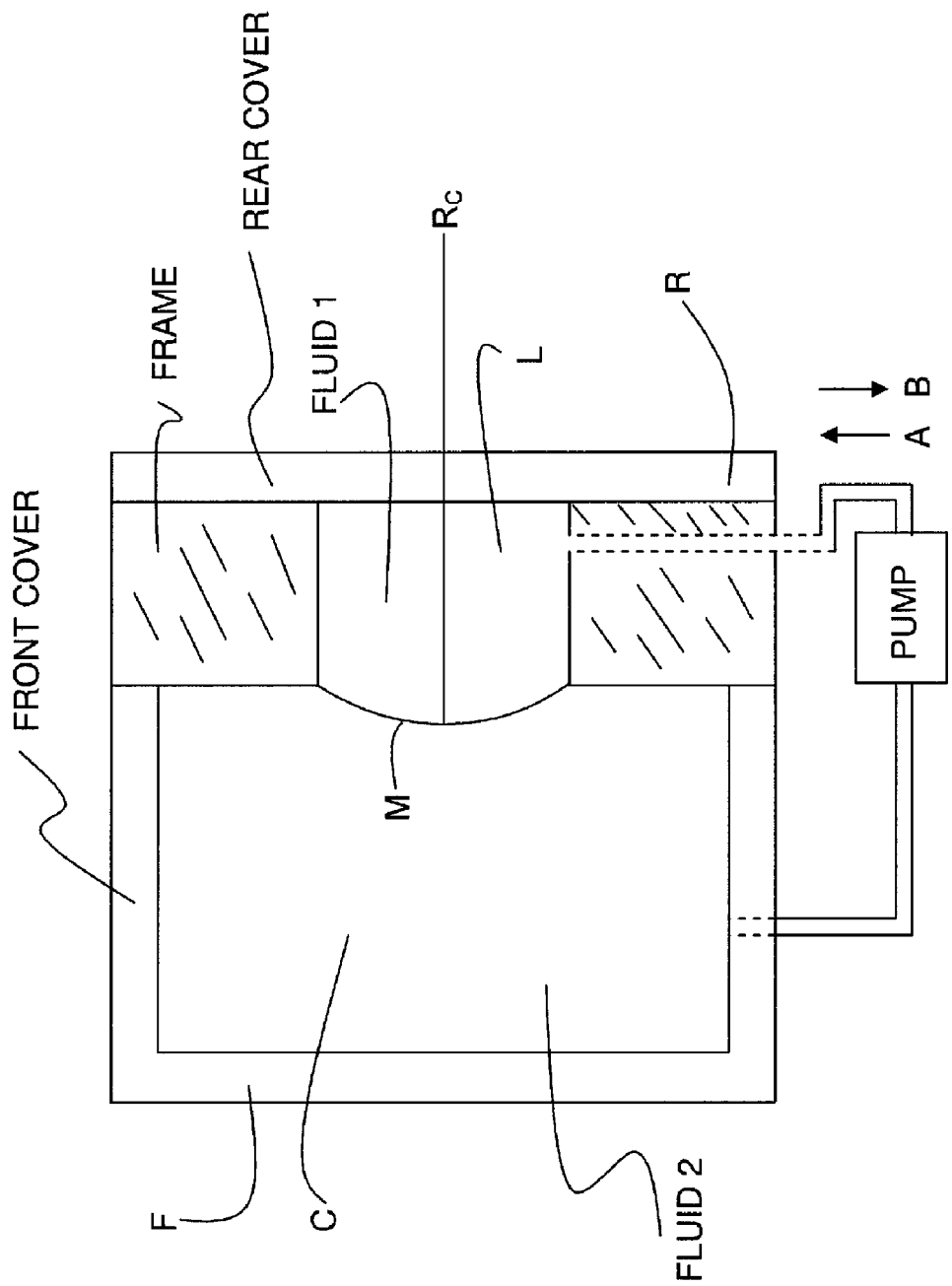
FIG. 12 shows a closed lens embodiment in which a fluid lens pump is used to maintain and change the curvature of the lens.

These problems may be prevented by using a sealed or closed system as described herein. In particular, a closed lens configuration is contemplated having front window F and optional rear window R, which will generally be formed of transparent optical plastic or glass, as shown in FIG. 12, which depicts the front and rear cavities of the lens structure. Front window F partially bounds a space or chamber volume C between the front window and the surface of the fluid lens. Chamber volume C contains air or a second Fluid 2, in contrast to a first Fluid 1 comprising the lens itself, that is, comprising lens volume L. Fluid 1 has a refractive index $N_1$, and Fluid 2 has a refractive index $N_2$, with $N_1 \neq N_2$. The front and rear windows prevent contamination, evaporation, or wicking away of the lens fluid. This is of particular importance when the lens is formed by surface tension of a hydraulic fluid. In a sealed system, the hydraulic fluid volume in the lens volume L is changed, causing the lens surface curvature to change. This causes the lens power to change; a change in the curvature of meniscus M will cause a change in the radius of curvature $R_C$, which is the radius of a circle of which meniscus M represents an arc, either increasing the radius or decreasing it up to and including transition to a negative radius of curvature, in which the meniscus inverts from convex to concave. However, if the cavity were sealed without a way for the non-pumped side of the curved surface to accommodate the change in volume, the fluid in this non-pumped volume would have to be compressed. In one embodiment, it may be desirable to develop a pump that is connected to both sides of the lens surface—that is, to both lens volume L and chamber volume C—such that the volumes of both sides of the lens surface are changed by the some amount. Two pump configurations are shown that accomplish this.

Figure 13:
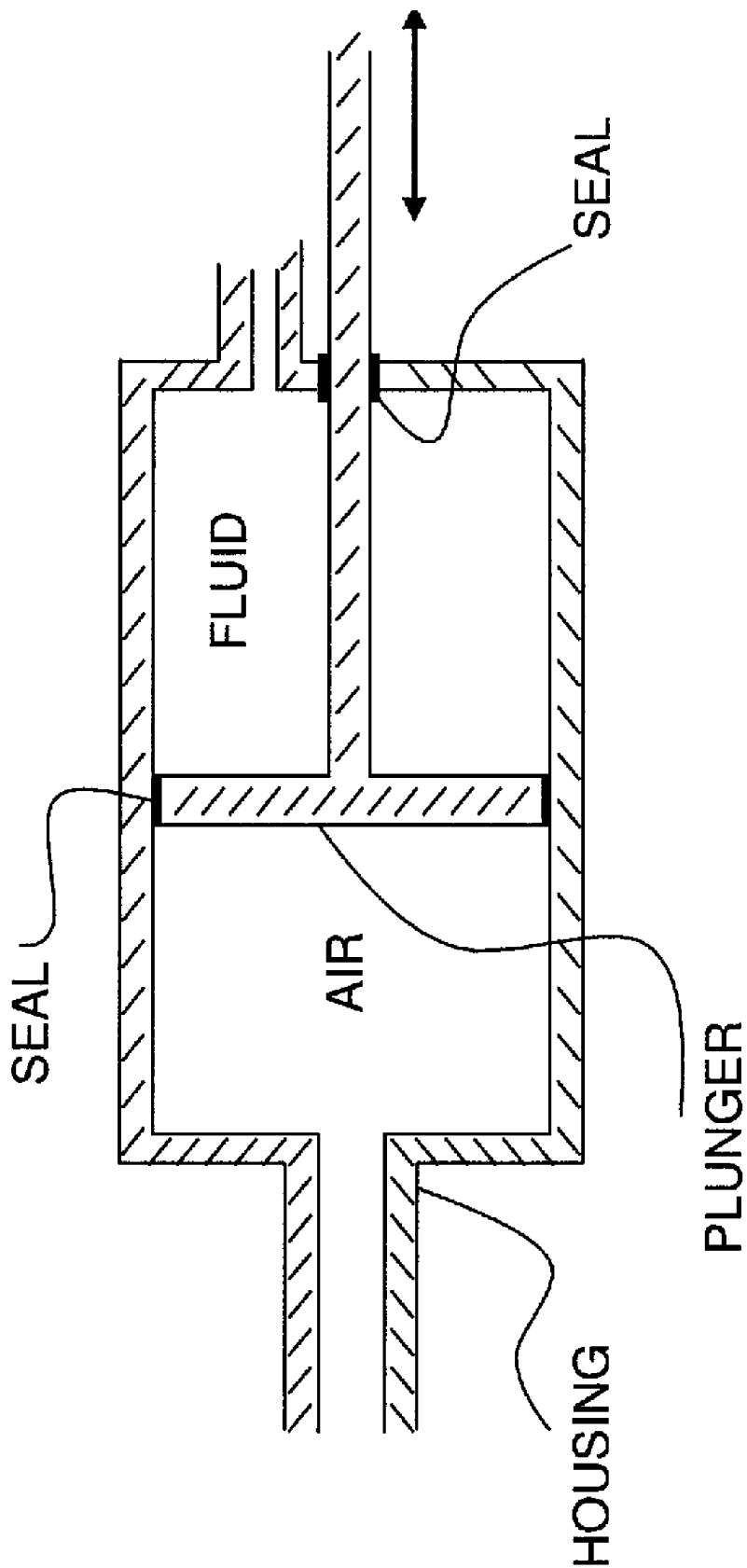
FIG. 13 presents one embodiment of a pump system that may be used in the closed lens configuration.

FIG. 13 depicts a plunger pump that may be used with alternate sides of the plunger being connected to alternate sides of the fluid lens cavity. As shown, the left side of the pump is connected to chamber (first) volume C of FIG. 12, while the right side connects to the lens (second) volume L. The plunger is moved to change the lens curvature. Movement of the plunger to the left as shown in FIG. 13 will pull fluid from the lens volume L while pushing air into the chamber volume C, causing the radius of curvature, R, to increase. Conversely, movement of the plunger to the right will pull air from the chamber volume C while pushing fluid into the lens volume L, thereby causing the radius of curvature, R, to decrease. If chamber C is filled with air (Fluid 2), and chamber L is filled with water (Fluid 1), decreasing the radius of curvature will result in a decrease in the focal length for the lens.

Figure 14:
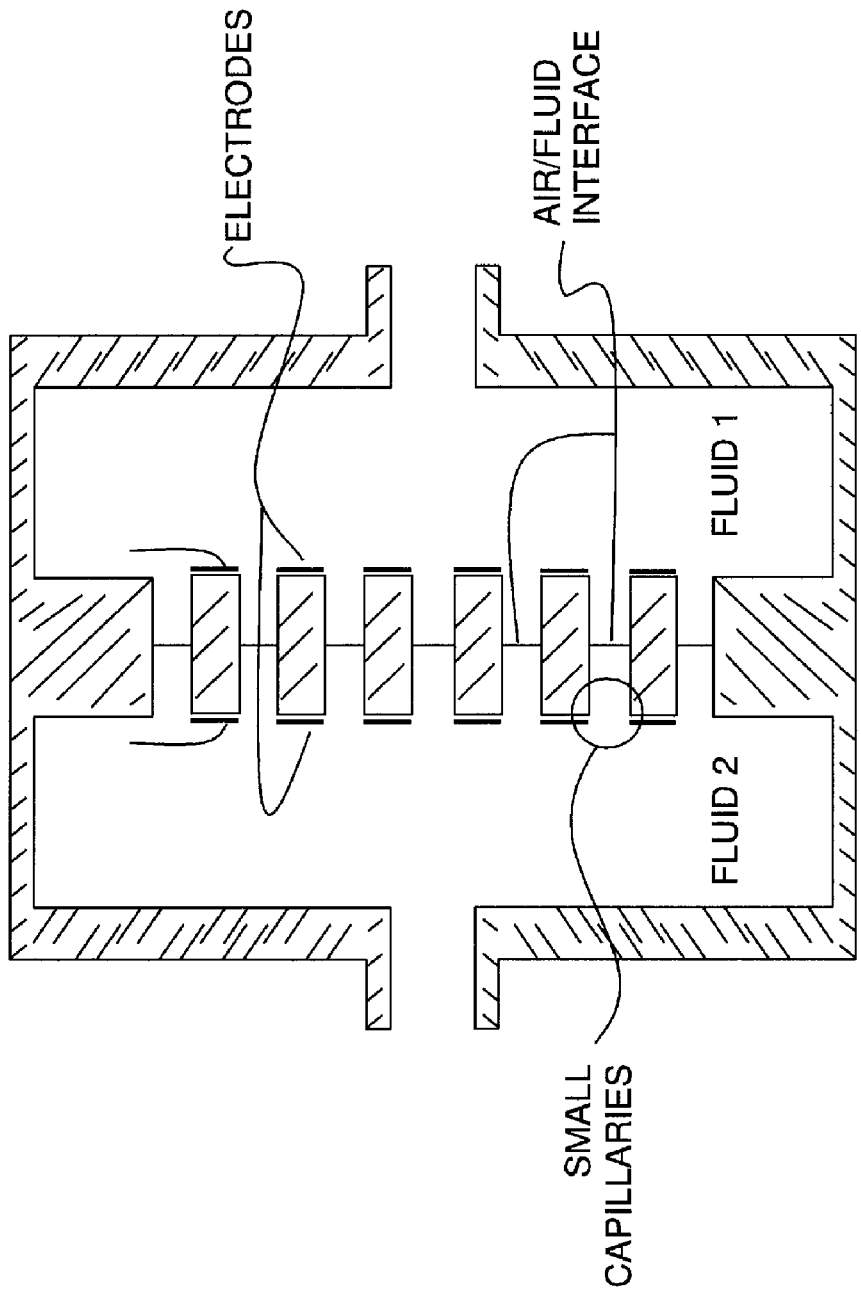
FIG. 14 presents another embodiment of a pump system that may be used in the closed lens configuration.

Alternatively, as shown in FIG. 14, an electrostatic pump may be used to change the location of a fluid-to-fluid interface (where one of the fluids may be a gas such as air) in a parallel group of small capillary tubes by applying a potential difference between the two ends of the capillaries. By changing the relative potential between the two set of electrodes on opposite sides of the pump, the position of the Fluid 1/Fluid 2 interface can be changed. (Each electrode is wired to a power source, in parallel on each side of the capillary array; in FIG. 14 the wires for the top pair of electrodes only are shown for illustrative purposes only.) When connected to the fluid lens structure of FIG. 12, a change in the position of this interface results in a fluid lens radius of curvature change for the Fluid 1/Fluid 2 interface. The diameter of these microchannels are on the order of several micrometers.

In both embodiments the two fluid volumes, namely volume C between the front window and the front surface of the fluid lens, and volume L represented by the material of the fluid lens itself, are operably connected through the pump; that is, movement or actuation of the pump mechanism to cause a change in one volume will thereby cause a corresponding change in the other volume.

Of course, it is not essential that the change in volume of Fluid 1 be offset by a corresponding reduction in the quantity of Fluid 2. If, for example, Fluid 2 is sufficiently compressible under the force applied to Fluid 1, lens volume L may be increased at least partially by compressing Fluid 2 rather than by removing a corresponding quantity of Fluid 2 from chamber volume C through the pump system. Depending on the system configuration and choice of materials, it may be possible to increase lens volume L with no removal of Fluid 2 from chamber volume C, that is, lens volume L may be increased solely though compression of Fluid 2. This applies equally to a reduction of lens volume L; rather than adding a corresponding amount of Fluid 2 to chamber volume C, the decrease in lens volume L may be accompanied by an expansion of Fluid 2, either in part or in whole. In other words, an increase or decrease of lens volume L may be accompanied by an increase or decrease in the pressure in chamber volume C. For example, chamber volume C and lens volume L may not be operably linked, and instead be separately controlled by separate pump systems, or the two volumes may each be sealed with both, or only one, subject to control by a pump system. Operation of a single pump system on only one volume would change the pressure of that volume, and hence the pressure exerted by that volume on the second volume, changing the radius of curvature of the meniscus in the process.

Figure 15:
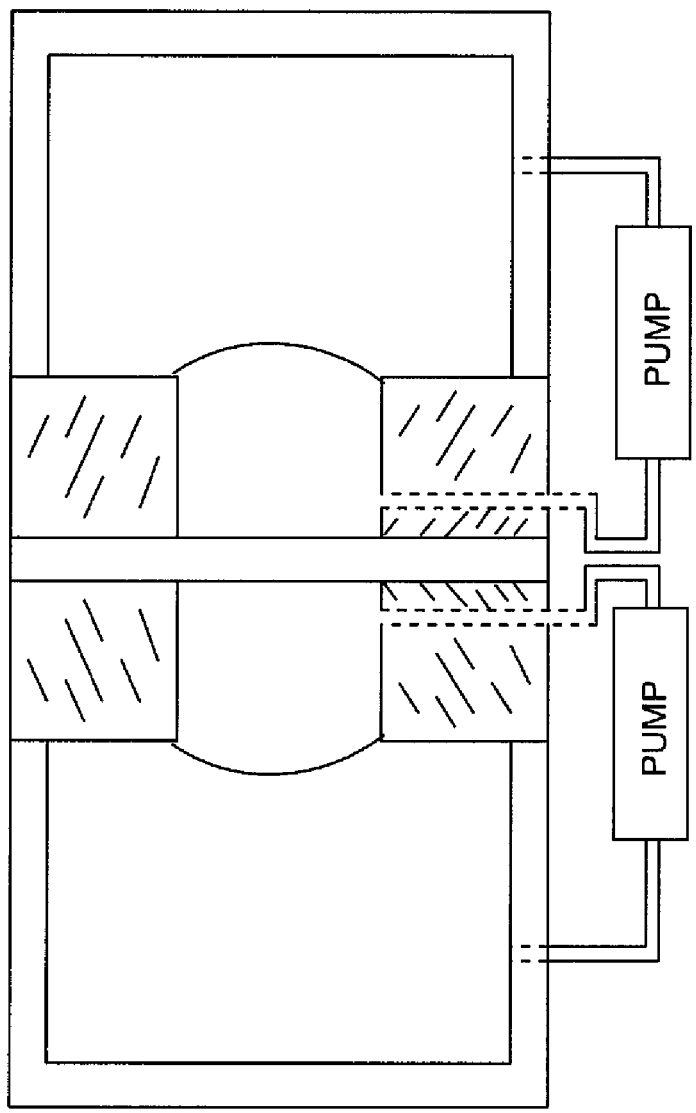
FIG. 15 presents an embodiment involving two closed lens configurations operating in series.

The above discussion and accompanying figures are primarily directed to a fluid lens system in which there is a single lens having optically clear windows at front and back. This configuration may readily be adapted to systems having plural lenses, preferably independently operable, such as by plural pump systems. One representative embodiment is provided in FIG. 15, which essentially comprises two lens systems of the type shown in FIG. 12 back-to-back in mirror image. It is contemplated, in this and other plural lens systems, that the respective lenses may have different diameters as well. Changes in the diameter will affect the rate of change to the radius of curvature in response to a given change or rate of change in the pressure/volume of any fluid. Further embodiments will be readily apparent to those of skill in the art.

Figure 16:
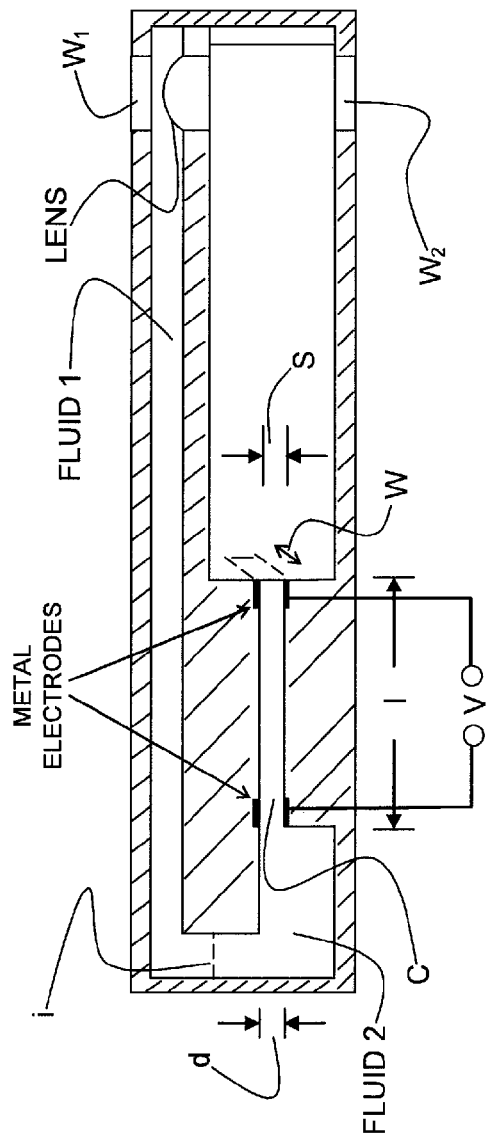
FIG. 16 presents an embodiment in which the lens and pump control system are highly integrated.

FIG. 16 presents another embodiment of the pump/lens system of the present invention. In this unitary embodiment, Fluid 1 and Fluid 2 are separated by interface i. The lens is positioned between a first optically clear window $w_1$ and second optically clear window $w_2$. A rectangular pump channel c is located within the body of the pump/lens system, the channel having length l, separation s, and width w. By way of non-limiting example, channel length l may be about 1 mm, separation s may be about 1 μm, and width w may be about 5 mm; however, in any event at least one such dimension of the pump channel should be less than about 10 microns. Metal electrodes disposed at each end and on either side of the pump channel are used to control pressure on the fluid in the channel, moving the interface in either direction and changing the radius of curvature of the lens accordingly. (As in FIG. 14, wires are shown only for the upper electrodes for illustrative purposes only, the wires/electrodes being used to create a potential difference V therebetween.)

In characterizing how the lens is affected by changes in the fluid volumes, whether of quantity, pressure, or both, reference may be made to the radius of curvature of the lens, the location of the surface of the meniscus, the shape of the meniscus, and the diameter of the lens/meniscus. By way of example, the fluid lens itself may be in the shape of a meniscus, having by approximation a spherical surface, as shown in FIGS. 12 and 16. The diameter of the lens is fixed in a channel or receptacle, while the meniscus portion may expand or contract in response to changes in the volume/pressures of the fluids forming the lens system, including the fluid forming the lens itself. The edge or perimeter of the meniscus, where the domed portion meets the sidewalls, remains constant, with a fixed diameter. The meniscus is analogous to a flexible membrane whose diameter has been sealed to a closed volume into which air may be added or removed, thereby expanding or deflating the membrane. Inflation causes the membrane to expand, causing the radius of curvature to decrease. Similarly, allowing gas to escape from an expanded membrane causes it to contract with a corresponding increase in the radios of curvature. Any such change causes physical parameters of the membrane to change, including its radius of curvature. Similarly, any change to the fluid lens effected by the control mechanisms of the present invention will result in certain physical changes, such as the radius of curvature of the meniscus.

Figure 17:
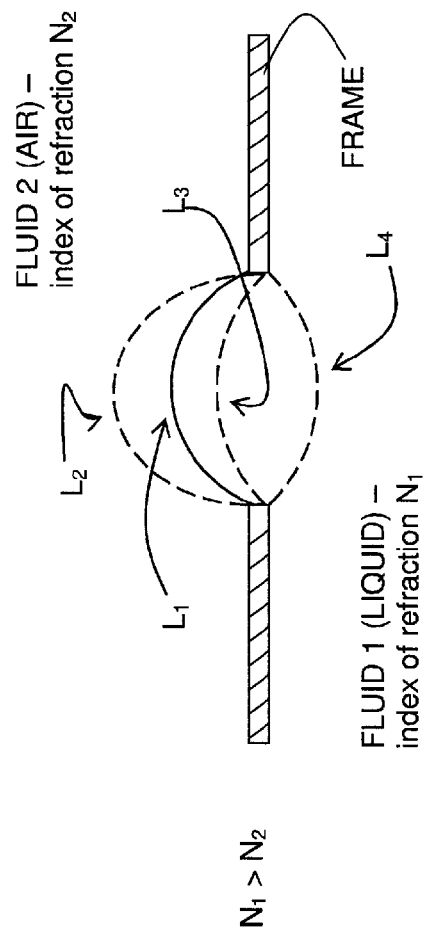
FIG. 17 presents a detail of the lens structure showing changes in radius of curvature.

FIG. 17 provides a closer view of one embodiment of the fluid lens itself, showing possible alternative radii of curvatures that the lens surface, or meniscus, might assume depending on the movements of, and/or pressures on, the fluids brought about by the control systems as described herein. For example, taking the changes in position/shape of the meniscus as shown in FIG. 17, and effecting those changes to the fluid lens shown in FIG. 12, operation of the pump causes a first fluid movement in direction A, which will cause a movement of the surface of the meniscus shown in FIG. 12 to the left, while operation in direction B will move it to the right, of the position in which it is presented in FIG. 12. Solid line $L_1$ represents a possible resting or default state of the meniscus that forms the surface of the lens, and whose position relative to the frame and radius of curvature affect the focal length of the lens. Dotted line $L_2$ shows movement of the meniscus outward or upward relative to the default or resting position. This change in position would result in a decrease in the radius of curvature, and for the case shown in FIG. 17 with $N_1 > N_2$, the focal length of the lens will be decreased. Dotted line $L_3$ shows movement of the meniscus inward or downward relative to the default or resting position, which still maintaining a convex curvature, while having a larger radius of curvature than $L_2$. Dotted line $L_4$ shows further movement of the meniscus inward or downward relative to the default or resting position $L_1$, in this case resulting in transition of the meniscus from the convex to the concave. This change in shape and position of the meniscus would result in a lens having a negative focal length.

FIGS. 18A-18D represent various lens structures and control systems or mechanisms for control of the fluid lens. In particular, FIG. 18C represents an electromagnetic solenoid control mechanism that may be used to actuate the plunger, and FIG. 18D represents an electrostatic plunger control mechanism consisting of a dielectric plunger between two capacitor plates.

It may also be desirable to include, in effect, a safety valve such that, for example, a change in one of the volumes will not produce a change, or at least not a corresponding change, in the other volume. This could be accomplished by providing a safety valve or functionally similar device that will come into play if there is a change in one or both volumes that does not take place in response to deliberate actuation of the pump mechanism. Examples would include thermal expansion or contraction of the fluid, and mechanical shock.

Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

I claim:

1. An imager for use in a data collection device, said imager comprising a fluid lens system for focusing light received by said data collection device from a target image, said fluid lens system comprising:
    an optically clear front window,
    a fluid lens having a front surface and a rear surface,
    a first volume bounded by said front window and said front surface of said fluid lens, said first volume having a first fluid disposed therein;
    an optically clear rear window;
    a second volume bounded by the front surface of said fluid lens and said rear window, said second volume having a second fluid disposed therein; and
    a sealed system comprising a pump, a first channel connecting said first volume to said pump, and a second channel connecting said second volume to said pump, wherein said pump comprises a seal that separates said first fluid and said second fluid, and wherein operation of said pump to effect a first change in the quantity of fluid in either of said first volume or said second volume results in a corresponding second change in the quantity of fluid in the other of said first volume or said second volume, wherein the front surface of said fluid lens defines a meniscus, and wherein the fluid lens system is operative so that curvature of the meniscus is changed responsively to change in the quantity of fluid in either of said first volume or said second volume.

2. The imager as defined by claim 1, wherein said optically clear front window is composed of a material selected from the group consisting of optically clear glass and optically clear plastic.

3. The imager as defined by claim 1, wherein said first volume contains a fluid having a diffractive index $N_2$ and said second volume contains a fluid having a diffractive index $N_1$, further wherein $N_2 \neq N_1$.

4. The imager as defined by claim 1, wherein said pump comprises a plunger, electrostatic electrodes, or piezoelectric material.

5. The imager of claim 4, wherein said corresponding second change in the quantity of fluid in the other of said first volume or said second volume is equal but opposite to said first change in the quantity of fluid in either of said first volume or said second volume.

6. The imager as defined in claim 4, wherein said pump is an electrostatic pump, further wherein said electrostatic pump comprises an interface between said first fluid and second fluid, said interface being located within a capillary channel and being selectively moveable in response to changes in electric potential.

7. The imager as defined by claim 6, wherein said changes in electric potential are created by electrodes positioned adjacent either end of said capillary channel.

8. The imager as defined by claim 7, further comprising a plurality of capillary channels, each of said capillary channels having electrodes positioned adjacent either end thereof.

9. The imager as defined by claim 8, wherein said plurality of said capillary channels are substantially parallel to each other.

10. The imager as defined by claim 6, wherein said capillary channel has one dimension that is less than 10 microns.

11. The imager of claim 1, further comprising means to prevent a corresponding second change in the quantity of fluid in the other of said first volume or said second volume in response to a first change in the quantity of fluid in either of said first volume or said second volume when said first change is not in response to deliberate actuation of said pump.

12. The imager of claim 11, wherein said means comprises a safety valve.

13. The imager of claim 11, wherein said first change is the result of thermal expansion of at least one of said first volume or said second volume.

14. The imager of claim 11, wherein said first change is the result of thermal contraction of at least one of said first volume or said second volume.

15. The imager of claim 11, wherein said first change is the result of mechanical shock to at least one of said first volume or said second volume.

16. The imager of claim 11, wherein said imager further comprises a fluid lens control module and a temperature sensor for measuring a temperature in a vicinity of said fluid lens, said fluid lens control module for applying to said fluid lens a fluid lens control signal based on information output by said temperature sensor.

17. The imager as defined by claim 1, wherein the fluid lens having a front surface defining the meniscus is configured so that the meniscus is operative to transition between convex and concave curvatures.

18. The imager as defined by claim 1, wherein said pump comprises piezoelectric material.

19. A data reader for reading an indicium, said data reader comprising a case configured to be held in a hand of a user of the data reader, said case configured to house components of said data reader, said components comprising:

- a lens system for focusing illumination representing an image of said indicium, said lens system comprising a fluid lens;
- a fluid lens control module for applying a fluid lens control signal to said fluid lens to control an operational parameter thereof;
- an image sensor for receiving said focused illumination representing said image of said indicium;
- an image sensor control module for operating said image sensor to capture data comprising at least a portion of a frame of image data from said focused illumination representing said image of said indicium; and
- a processing module for processing said at least a portion of said frame of image data to extract therefrom information by the indicium, said lens system further comprising;
- an optically clear front window,
- a fluid lens having a front surface and a rear surface,
- a first volume bounded by said front window and said front surface of said fluid lens, said first volume having a first fluid disposed therein
- an optically clear rear window, and
- a second volume bounded by the front surface of said fluid lens and said rear window, said second volume having a second fluid disposed therein; and
- a sealed system comprising a pump, a first channel connecting said first volume to said pump and a second channel connecting said second volume to said pump wherein said pump comprises a seal that separates said first fluid and said second fluid, and wherein operation of said pump to effect a first change in the quantity of fluid in either of said first volume or said second volume results in a corresponding second change in the quantity of fluid in the other of said first volume or said second volume.

* * * * *